(12) United States Patent
Parsonnet et al.

(10) Patent No.: US 8,528,345 B2
(45) Date of Patent: *Sep. 10, 2013

(54) MANAGED VIRTUAL POWER PLANT UTILIZING AGGREGATED STORAGE

(75) Inventors: Brian Parsonnet, Fort Collins, CO (US); Ramachandran Narayanamurthy, Loveland, CO (US)

(73) Assignee: Ice Energy, Inc., Windsor, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/541,424

(22) Filed: Jul. 3, 2012

(65) Prior Publication Data
US 2012/0271476 A1    Oct. 25, 2012

Related U.S. Application Data

(63) Continuation of application No. 12/335,871, filed on Dec. 16, 2008, now Pat. No. 8,234,876, which is a continuation-in-part of application No. 11/610,982, filed on Dec. 14, 2006, now Pat. No. 7,854,129, which is a continuation-in-part of application No. 10/967,114, filed on Oct. 15, 2004, now Pat. No. 7,162,878.

(60) Provisional application No. 60/511,952, filed on Oct. 15, 2003.

(51) Int. Cl.
*F25D 3/00* (2006.01)

(52) U.S. Cl.
USPC .................................. 62/59; 62/436

(58) Field of Classification Search
USPC ..... 62/59, 436, 437, 139, 333, 231; 700/286, 700/291; 307/46, 64, 66
See application file for complete search history.

(56) References Cited

U.S. PATENT DOCUMENTS

| | | |
|---|---|---|
| 1,969,187 A | 8/1934 | Schutt |
| 2,512,576 A | 6/1950 | Cross |

(Continued)

FOREIGN PATENT DOCUMENTS

| | | |
|---|---|---|
| DE | 100 57 834 A1 | 9/1957 |
| DE | 298 23 175 U1 | 7/1999 |

(Continued)

OTHER PUBLICATIONS

U.S. Appl. No. 11/138,762, Non-Final Office Action, pp. 1-15.

(Continued)

*Primary Examiner* — Mohammad M Ali
(74) *Attorney, Agent, or Firm* — Paul M. Thompson; Cochran Freund & Young LLC

(57) ABSTRACT

Disclosed is a system and method for providing power generation and distribution with on-site energy storage and power input controlled by a utility or a third party manager. The system allows a utility manager to decide and direct how energy is delivered to a customer on both sides of the power meter, while the customer directs and controls when and how much energy is needed. In the disclosed embodiments, the utility controls the supply (either transmitted or stored) and makes power decisions on a system that acts as a virtual power plant, while the end-user retains control of the on-site aggregated power consumption assets. The disclosed systems act to broker the needs of the utility and end-user by creating, managing and controlling the interface between these two entities.

29 Claims, 11 Drawing Sheets

(56) References Cited

U.S. PATENT DOCUMENTS

| | | |
|---|---|---|
| 2,661,576 A | 12/1953 | Gartner |
| 2,737,027 A | 3/1956 | Kleist |
| 3,156,101 A | 11/1964 | McGuffey |
| 3,746,084 A | 7/1973 | Ostbo |
| 4,073,306 A | 2/1978 | Neyer |
| 4,129,014 A | 12/1978 | Chubb |
| 4,176,525 A | 12/1979 | Tucker et al. |
| 4,274,849 A | 6/1981 | Garier et al. |
| 4,280,335 A | 7/1981 | Perez et al. |
| 4,291,757 A | 9/1981 | Redden |
| 4,294,078 A | 10/1981 | MacCracken |
| 4,313,309 A | 2/1982 | Lehman, Jr. |
| 4,403,645 A | 9/1983 | MacCracken |
| 4,484,449 A | 11/1984 | Muench |
| 4,565,069 A | 1/1986 | MacCracken |
| 4,608,836 A | 9/1986 | MacCracken et al. |
| 4,609,036 A | 9/1986 | Schrader |
| 4,619,317 A | 10/1986 | Disselbeck et al. |
| 4,656,839 A | 4/1987 | Cross et al. |
| 4,735,064 A | 4/1988 | Fischer |
| 4,745,767 A | 5/1988 | Ohya et al. |
| 4,893,476 A | 1/1990 | Bos et al. |
| 4,916,916 A | 4/1990 | Fischer |
| 4,921,100 A | 5/1990 | Krause |
| 4,940,079 A | 7/1990 | Best et al. |
| 4,964,279 A | 10/1990 | Osborne |
| 5,005,368 A | 4/1991 | MacCracken et al. |
| 5,036,904 A | 8/1991 | Kanda et al. |
| 5,079,929 A | 1/1992 | Alsenz |
| 5,109,920 A | 5/1992 | Merryful |
| 5,211,029 A | 5/1993 | Uselton et al. |
| 5,237,832 A | 8/1993 | Alston |
| 5,241,829 A | 9/1993 | Irie et al. |
| 5,255,526 A | 10/1993 | Fischer |
| 5,307,642 A | 5/1994 | Dean |
| 5,323,618 A | 6/1994 | Yoshida et al. |
| 5,335,508 A | 8/1994 | Tippmann |
| 5,366,153 A | 11/1994 | Swenson |
| 5,383,339 A | 1/1995 | McCloskey et al. |
| 5,423,378 A | 6/1995 | Dillenbeck et al. |
| 5,467,812 A | 11/1995 | Dean et al. |
| 5,598,716 A | 2/1997 | Tanaka et al. |
| 5,598,720 A | 2/1997 | MacCracken et al. |
| 5,612,580 A * | 3/1997 | Janonis et al. ............ 307/64 |
| 5,647,225 A | 7/1997 | Fischer et al. |
| 5,678,626 A | 10/1997 | Gilles |
| 5,682,752 A | 11/1997 | Dean |
| 5,715,202 A | 2/1998 | Harima |
| 5,720,178 A | 2/1998 | Silvetti et al. |
| 5,740,679 A | 4/1998 | Ueno et al. |
| 5,755,104 A | 5/1998 | Rafalovich et al. |
| 5,927,101 A | 7/1999 | Oh |
| 5,990,577 A * | 11/1999 | Kamioka et al. ............ 307/26 |
| 5,992,160 A | 11/1999 | Bussjager et al. |
| 6,011,324 A * | 1/2000 | Kohlstruck et al. ......... 307/64 |
| 6,055,163 A * | 4/2000 | Wagner et al. ............. 363/37 |
| 6,064,125 A * | 5/2000 | Stendardo et al. .......... 307/64 |
| 6,112,543 A | 9/2000 | Feuerecker et al. |
| 6,131,398 A | 10/2000 | Versteijnen |
| 6,131,401 A | 10/2000 | Ueno et al. |
| 6,158,499 A | 12/2000 | Rhodes et al. |
| 6,191,500 B1 * | 2/2001 | Toy .......................... 307/64 |
| 6,212,898 B1 | 4/2001 | Ueno et al. |
| 6,237,358 B1 | 5/2001 | Kondo et al. |
| 6,240,337 B1 * | 5/2001 | Marr et al. ............... 700/286 |
| 6,243,818 B1 * | 6/2001 | Schwan et al. ............ 713/300 |
| 6,247,522 B1 | 6/2001 | Kaplan et al. |
| 6,250,098 B1 | 6/2001 | Huang |
| 6,260,376 B1 | 7/2001 | Khelifa et al. |
| 6,298,683 B1 | 10/2001 | Kondo et al. |
| 6,327,871 B1 | 12/2001 | Rafalovich |
| 6,370,908 B1 | 4/2002 | James |
| 6,460,355 B1 | 10/2002 | Trieskey |
| 6,474,089 B1 | 11/2002 | Chen |
| D501,490 S | 2/2005 | Kerrigan |
| 6,895,773 B2 | 5/2005 | Amaral |
| 6,900,738 B2 * | 5/2005 | Crichlow ............... 340/870.02 |
| 6,947,854 B2 * | 9/2005 | Swarztrauber et al. ......... 702/62 |
| 7,124,594 B2 | 10/2006 | McRell |
| 7,152,413 B1 | 12/2006 | Anderson |
| 7,162,878 B2 | 1/2007 | Narayanamurthy et al. |
| 7,210,308 B2 | 5/2007 | Tanimoto et al. |
| 7,363,772 B2 | 4/2008 | Narayanamurthy |
| 7,421,846 B2 | 9/2008 | Narayanamurthy et al. |
| 7,503,185 B2 | 3/2009 | Narayanamurthy |
| 7,543,455 B1 | 6/2009 | Chen |
| 7,610,773 B2 | 11/2009 | Rafalovich et al. |
| 7,669,212 B2 * | 2/2010 | Alao et al. .................... 725/32 |
| 7,690,212 B2 | 4/2010 | Narayanamurthy et al. |
| 7,778,940 B2 * | 8/2010 | Mazzarella ................. 705/412 |
| 7,793,515 B2 | 9/2010 | Narayanamurthy |
| 7,836,721 B2 | 11/2010 | Nishiwaki et al. |
| 7,945,502 B2 * | 5/2011 | Mashinsky et al. ............ 705/37 |
| 8,015,836 B2 | 9/2011 | Kameyama et al. |
| 2002/0124583 A1 | 9/2002 | Satoh |
| 2002/0162342 A1 | 11/2002 | Weng et al. |
| 2004/0007011 A1 | 1/2004 | Tanaka |
| 2004/0221589 A1 | 11/2004 | Dube et al. |
| 2005/0081557 A1 | 4/2005 | McRell |
| 2005/0132734 A1 | 6/2005 | Narayanamurthy et al. |
| 2005/0262870 A1 | 12/2005 | Narayanamurthy et al. |
| 2007/0095093 A1 | 5/2007 | Narayanamurthy |
| 2008/0034760 A1 | 2/2008 | Narayanamurthy et al. |
| 2008/0141699 A1 | 6/2008 | Rafalovich et al. |
| 2009/0133412 A1 | 5/2009 | Narayanamurthy et al. |
| 2010/0170286 A1 | 7/2010 | Ghiraldi |
| 2011/0011119 A1 | 1/2011 | Kuehl et al. |

FOREIGN PATENT DOCUMENTS

| | | |
|---|---|---|
| DE | 198 31 127 A1 | 3/2001 |
| DE | 1 015 019 | 6/2002 |
| EP | 0 641 978 B2 | 7/1998 |
| EP | 1 441 183 A1 | 7/2004 |
| JP | 58-217133 | 12/1983 |
| JP | 60 036835 A | 2/1985 |
| JP | A-2000-266368 | 1/1996 |
| JP | 8-226682 | 9/1996 |
| JP | 10-339483 | 12/1998 |
| JP | A-2001-296068 | 12/1998 |
| JP | 8-14628 | 9/2000 |
| JP | A-2000-249420 | 10/2001 |
| WO | WO 2005/001345 A1 | 1/2005 |
| WO | WO 2005/038367 | 4/2005 |
| WO | WO 2005/116547 A | 12/2005 |
| WO | WO 2006/023716 A | 3/2006 |

OTHER PUBLICATIONS

U.S. Appl. No. 11/138,762, Final Office Action, pp. 1-6.
U.S. Appl. No. 11/284,533, Non Final Office Action, pp. 1-11.
International Search Report for PCT/US2005/042409, International Searching Authority, Oct. 5, 2006, pp. 1-17.
International Search Report for PCT/US2005/018616, International Searching Authority, Oct. 10, 2005, pp. 1-14.
International Search Report for PCT/US2009/34087, International Searching Authority, pp. 1-13.
International Search Report for PCT/US2009/045427, International Searching Authority, pp. 1-11.
International Search Report for PCT/US2012/031168, International Searching Authority, pp. 1-18.
International Search Report for PCT/US2005/029535, International Searching Authority, May 12, 2005, pp. 1-12.
Notice of Allowance, U.S. Appl. No. 11/208,074, pp. 1-14.
Notice of Allowance, U.S. Appl. No. 12/100,893, pp. 1-15.
Non Final Office Action, U.S. Appl. No. 12/324,369, Dated Mar. 5, 2012, pp. 1-16.

* cited by examiner

| TIME PERIOD AND MODE | AIR CONDITIONER UNIT | OIL STILL/ SURGE VESSEL | ICE FREEZING/ DISCHARGE COILS | PRESSURE OPERATED SLIDE VALVE |
|---|---|---|---|---|
| 1. REFRIGERANT ENERGY STORAGE | ON | OIL STILL | MAKING ICE, WITH REFRIGERANT FLOW BOTTOM TO TOP | CLOSED |
| 2. COOLING | OFF | SURGE VESSEL | CONDENSING, WITH REFRIGERANT FLOW TOP TO BOTTOM | OPEN |
| 2. PUSH | ON | COMBINATION OIL STILL AND SURGE VESSEL | CONDENSING, WITH REFRIGERANT FLOW TOP TO BOTTOM | OPEN |

FIGURE 3

MANAGED VIRTUAL POWER PLANT UTILIZING AGGREGATED STORAGE

CROSS REFERENCE TO RELATED APPLICATIONS

This application is a continuation of U.S. patent application Ser. No. 12/335,871 entitled "Utility Managed Virtual Power Plant Utilizing Aggregated Thermal Energy Storage" filed Dec. 16, 2008, by Parsonnet et al., which is a continuation-in-part of U.S. patent application Ser. No. 11/610,982 entitled "Refrigeration Apparatus" by Ramachandran Narayanamurthy et al., filed Dec. 14, 2006 and issued as U.S. Pat. No. 7,854,129 on Dec. 21, 2010, which is a continuation-in-part of U.S. patent application Ser. No. 10/967,114 entitled "Refrigeration Apparatus" by Ramachandran Narayanamurthy et al., filed Oct. 15, 2004 and issued as U.S. Pat. No. 7,162,878 on Jan. 16, 2007, which claims the benefit of and priority to U.S. provisional application No. 60/511,952, entitled "Refrigerant Based High Efficiency Energy Storage and Cooling System", filed Oct. 15, 2003. The entire contents of the above listed applications are hereby specifically incorporated herein by reference for all they disclose and teach.

BACKGROUND OF THE INVENTION

With the increasing demands on peak power consumption, ice storage is an environmentally benign method that has been utilized to shift air conditioning power loads to off-peak times and rates. A need exists not only for load shifting from peak to off-peak periods, but also for increases in air conditioning unit capacity and efficiency. Current air conditioning units having energy storage systems have had limited success due to several deficiencies including reliance on water chillers that are practical only in large commercial buildings, and have difficulty achieving high-efficiency. In order to commercialize advantages of thermal energy storage in large and small commercial buildings, thermal energy storage systems must have minimal manufacturing and engineering costs, maintain maximum efficiency under varying operating conditions, demonstrate simplicity in the refrigerant management design, and maintain flexibility in multiple refrigeration or air conditioning applications.

Systems for providing stored energy have been previously contemplated in U.S. Pat. No. 4,735,064, U.S. Pat. No. 4,916,916 both issued to Harry Fischer and to U.S. Pat. No. 5,647,225 issued to Fischer et al. All of these patents utilize ice storage to shift air conditioning loads from on-peak to off-peak electric rates to provide economic justification and are hereby specifically incorporated by reference for all they teach and disclose.

SUMMARY OF THE INVENTION

An embodiment of the present invention may therefore comprise: a system for temporarily shifting the demand for electrical power supplied to an end-user by an electrical utility comprising: an energy storage unit located in proximity of said end-user that receives alternating current electrical energy from an electric utility, converts said alternating current electrical energy into another form of energy, and stores said converted energy in a first time period, said energy storage unit that supplies said converted energy to said end-user reducing said end-user demand for said alternating current electrical energy in a second time period; a controller that controls the operation of said energy storage unit and controls supply of said stored energy to said end-user; and, a communications link between a utility manager and said controller that allows said utility manager to manage and control the operations of said controller thereby controlling storage and supply of said stored energy to said end-user.

An embodiment of the present invention may also comprise: a system for temporarily shifting the demand for electrical power supplied to an end-user by an electrical utility comprising: a central electrical power generation plant that generates said electrical power; an electrical power transmission and distribution network that links said power generation plant to an end-user and supplies said electrical power to said end-user; a utility manager that controls and manages said electrical power generation and distribution from said power generation plant to said end-user; a thermal energy storage unit located in proximity to said end-user that converts electric energy to thermal energy, stores said thermal energy and supplies said thermal energy to said end-user thereby reducing said end-user's demand for said electric energy to power heating or air conditioning; a controller that controls operation of said thermal energy storage unit and controls said conversion of said electric energy to said thermal energy and supply of said heating or air conditioning to said end-user; and, a communications link between said utility manager and said controller that allows said utility manager to manage and control the operations of said controller thereby controlling storage and supply of said stored energy to said end-user.

An embodiment of the present invention may also comprise: a method of temporarily supplementing the demand for alternating current electrical energy supplied to an end-user by an electrical utility comprising the steps: storing a portion of said alternating current electrical energy provided to said end-user by said electric utility with an energy storage unit located in proximity of said end-user comprising the steps: receiving alternating current electrical energy from an electric utility; converting said alternating current electrical energy into another form of energy; and, storing said converted energy in one time period, controlling the operations of said energy storage unit with a controller that regulates the amount of energy that is supplied to, and distributed from, said energy storage unit; controlling the operations of said controller by said electrical utility with a communications link between said electrical utility and said controller; supplementing said end-user demand for said alternating current electrical energy in a second time period by supplying said stored energy from said electrical utility controlled energy storage unit to said end-user.

An embodiment of the present invention may also comprise: a method of supplying the demand for cooling supplied to an end-user by an electrical utility comprising the steps: receiving alternating current electrical energy from an electric utility; converting said alternating current electrical energy into thermal energy; and, storing said thermal energy with a thermal energy storage unit located in proximity of said end-user; controlling by said end-user, a time period and amount of said cooling delivered to an end-user site; controlling by a utility manager, a source of said cooling to said end-user, wherein said source is electric energy converted to thermal energy, said stored thermal energy from said thermal energy storage unit or a combination thereof.

BRIEF DESCRIPTION OF THE DRAWINGS

In the drawings,

FIG. 3 is a table illustrating the component status for an embodiment of a high efficiency refrigerant cold storage and cooling system.

DETAILED DESCRIPTION OF THE INVENTION

Figure 1:
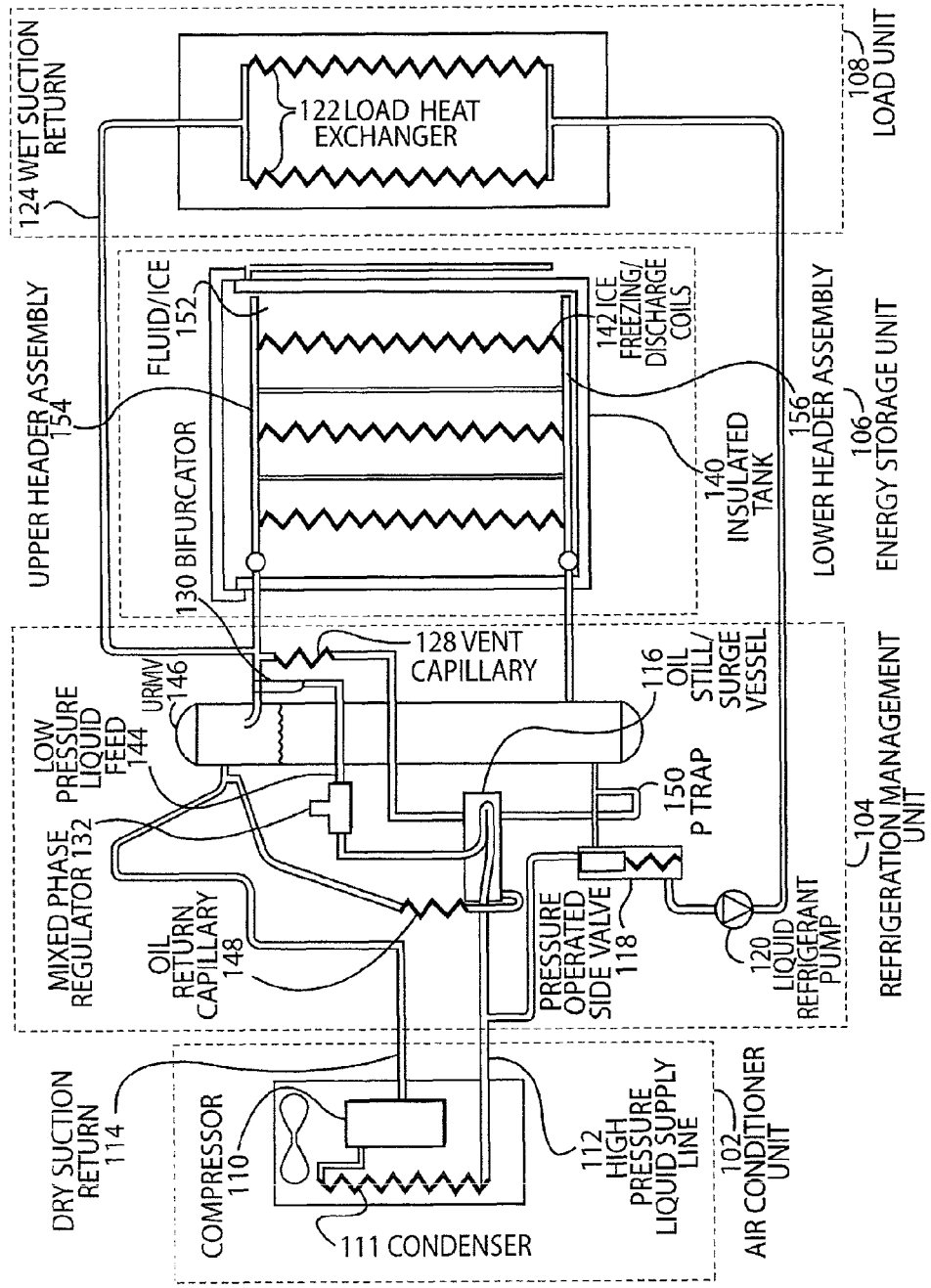
FIG. 1 illustrates an embodiment of a high efficiency refrigerant cold storage and cooling system in a mode used for cooling a process fluid.

While this invention is susceptible to embodiments in many different forms, there is shown in the drawings and will be described herein, in detail, specific embodiments thereof with the understanding that the present disclosure is to be considered as an exemplification of the principles of the invention and is not to be limited to the specific embodiments described.

The disclosed embodiments offer the advantage of using power from electric utility companies during low demand, off-peak hours, which are usually at night, when these companies use their most efficient equipment. For example, high efficiency electric generators, typically stream-driven, produce a kilowatt-hour (KWH) for approximately 8,900 BTU. In contrast, a peak hour high capacity electrical generator, such as a gas turbine, can use as much as 14,000 BTU to produce the same KWH of electricity. Second, the transmission lines also run cooler at night resulting in higher efficiency of energy usage. Finally, for air-cooled air-conditioning systems, operating the system at night afford a higher efficiency by lowering the temperature of the condensing unit.

The disclosed refrigerant-based thermal energy storage and cooling system is used as an example of one of many energy storage systems that may be utilized to operate at high efficiency and provide an overall system that shifts power usage without significant total energy losses. In addition, the increased efficiencies of off-peak power generation and off-peak compressor-based refrigerant cooling, a net reduction in the total energy consumption of an individual operating unit are realized.

FIG. 1 illustrates an embodiment of a high efficiency refrigerant cold storage and cooling system. The described embodiments minimize additional components and use nearly no energy beyond that used by the condensing unit to store the energy. The refrigerant cold storage design has been engineered to provide flexibility so that it is practicable for a variety of applications. The embodiments can utilize stored energy to provide chilled water for large commercial applications or provide direct refrigerant air conditioning to multiple evaporators. The design incorporates multiple operating modes, the ability to add optional components, and the integration of smart controls that allow energy to be stored and released at maximum efficiency. When connected to a condensing unit, the system stores refrigeration energy in a first time period, and utilizes the stored energy during a second time period to provide cooling. In addition, both the condensing unit and the refrigerant cold storage system can operate simultaneously to provide cooling during a third time period.

As shown in FIG. 1, an embodiment of a high efficiency refrigerant energy storage and cooling system is depicted with four major components incorporated in the system. The air conditioner unit 102 may be a conventional condensing unit that utilizes a compressor 110 and a condenser 111 to produce high-pressure liquid refrigerant delivered through a high-pressure liquid supply line 112 to the refrigeration management unit 104. The refrigeration management unit 104 is connected to an energy storage unit 106 comprising an insulated tank 140 with ice-making coils 142 and is filled with a phase change liquid such as water or other eutectic material. The air conditioner unit 102, the refrigeration management unit 104 and the energy storage assembly 106 act in concert to provide efficient cooling to the load heat exchanger 108 (indoor cooling coil assembly) and thereby perform the functions of the principal modes of operation of the system.

As further illustrated in FIG. 1, the compressor 110 produces high-pressure liquid refrigerant delivered through a high-pressure liquid supply line 112 to the refrigeration management unit 104. The high-pressure liquid supply line 112 is split and feeds an oil still/surge vessel 116 and a pressure operated slide valve 118. The still/surge vessel 116 is used to concentrate the oil in the low-pressure refrigerant and return it to the compressor 110 through the dry suction return 114. Without the still/surge vessel 116, some oil would remain in the accumulator vessel, ultimately causing the compressor 110 to seize due to lack of oil, and the heat exchangers to become less effective due to fouling. The vapor rises to the top of the still/surge vessel 116 and out vent capillary 128, to be re-introduced in the wet suction return 124. This is done to encourage vapor flow out of the heat exchanger within the still/surge vessel 116, and in the preferred direction. The length of the vent capillary 128 or similar regulated bleed device is used to control the pressure in the still/surge vessel 116, and hence, the boil rate and the volume of refrigerant in the system. The pressure operated slide valve 118 also allows a secondary supply of high-pressure liquid refrigerant that can bypass the rest of the refrigerant management system 104 and supplies liquid refrigerant to a liquid refrigerant pump 120 and directly to the load unit 108.

When activated, a liquid refrigerant pump 120 supplies the evaporator coils of the load heat exchanger 122 within the load portion 108 of the energy storage and cooling system with liquid refrigerant. Low-pressure refrigerant returns from the evaporator coils of the load heat exchanger 122 via wet suction return 124 to an accumulator or universal refrigerant management vessel (URMV) 146 and to the internal heat exchanger composed of ice freezing/discharging coils 142. The low-pressure vapor exits from the top of the URMV 146 and returns to the air conditioning unit 102 through dry suction return 114 along with the distilled oil enriched refrigerant flowing out of the bottom of the oil still/surge vessel 116 through an oil return capillary 148. The oil return capillary 148 controls the rate at which the oil is re-introduced into the system. Oil enriched liquid refrigerant passes through a P-trap 150, which eliminates (blocks) an undesired path for refrigerant should the still/surge vessel 116 become empty.

Additionally, the wet suction return 124 connects with a bifurcator 130 prior to the URMV 146. The bifurcator supplies low-pressure refrigerant from the mixed phase regulator 132 (TRVT). The mixed phase regulator 132 meters the flow of refrigerant within the system by incorporating a valve (orifice) that opens to release mixed phase refrigerant, only when there is sufficient quantity of liquid built up in the condenser 111. In this way, the compressor 110 driving the system needs merely to operate to feed high pressure refrigerant, which can be matched to the cooling load. This mixed phase regulator 132 prevents vapor bleeding into the low-pressure side (heat load portion) of the system and virtually eliminates vapor feed to the URMV 146 from the compressor 110, while also dropping the required pressure from the condenser pressure to the evaporator saturation pressure. This results in greater overall efficiency of the system while simplifying the liquid overfeed characteristics of the refrigerant management unit.

The insulated tank 140 contains dual-purpose ice freezing/discharging coils 142 (nominally geometrically designed helical coils), arranged for gravity circulation and drainage of liquid refrigerant, and is connected to an upper header assembly 154 at the top, and to a lower header assembly 156 at the bottom. The upper header assembly 154 extends outward through the insulated tank 140 to the refrigeration management unit 104. When refrigerant flows through the ice freezing/discharging coils 142 and header assemblies 154 and 156, the coils act as an evaporator and the fluid 152 solidifies in the insulated tank 140 during one time period. The ice freezing/discharging coils 142 and header assemblies 154 and 156 are connected to the low-pressure side of the refrigerant circuitry and are arranged for gravity or pumped circulation and drainage of liquid refrigerant. During a second time period, warm vapor phase refrigerant circulates through the ice freezing/discharging coils 142 and header assemblies 154 and 156 and melts the ice 152 providing a refrigerant condensing function.

In one embodiment, the insulated tank 140 utilized in the system is a double-walled rotomolded plastic tank with an R13 to R35 insulation value in the lid, walls, and bottom of the tank. Since the system normally operates in a daily charge and discharge cycle, rather than a weekly cycle, additional insulation values do not significantly improve overall performance. The insulated tank 140 integrates attachment points for externally mounted refrigerant management components and provides for egress of refrigeration piping. The tank is filled with water or eutectic material and incorporates an overflow to maintain fluid level during expansion of fluids.

The central device within the refrigerant management unit 104 is an accumulator vessel called the universal refrigerant management vessel or URMV 146. The URMV 146 is on the low-pressure side of the refrigerant circuitry and performs several functions. The URMV 146 separates liquid and vapor refrigerant during the refrigerant energy storage period and during the cooling period. The URMV 146 provides a column of liquid refrigerant during the refrigerant energy storage period that sustains gravity circulation through the ice freezing/discharging coils 142 inside the insulated tank 140. The URMV 146 is also a vapor disengaging vessel and provides for refrigerant storage. The dry suction return 114 to the compressor 110 during the energy storage time period is provided by an outlet at the top of the URMV vessel 140. The dry suction return 114 is placed in such a way to prevent liquid refrigerant from being returned to the compressor. A wet suction return 124 is provided through an inlet in the top of the URMV 146 for connection to an evaporator (load heat exchanger 122) during the time period when the refrigerant energy storage system provides cooling.

The first time period is the refrigerant energy storage time period or storing energy in ice. The output of the compressor 110 is high-pressure refrigerant vapor that is condensed to high-pressure liquid, (HPL). A valve (not shown) on the outlet of the refrigerant pump 120 is energized to close the connection to the load unit 108. High-pressure liquid is surrounded by low-pressure liquid refrigerant in a second refrigerant vessel that is a combination oil still/surge vessel 116 that is connected to the low side of the refrigerant system.

During this first time period (energy storage period), the oil still/surge vessel 116 is an oil still. During the cooling period, the oil still/surge vessel 116 acts as a refrigerant surge vessel. During the energy storage period, an internal heat exchanger, in which flows high-pressure liquid refrigerant from the air conditioner unit 102, keeps all but a small amount of low-pressure liquid refrigerant out of the oil still/surge vessel 116. The refrigerant that is inside the vessel boils at a rate determined by two capillary pipes. One capillary is the vent capillary 128 that controls the level of refrigerant in the oil still/surge vessel 116. The second, the oil return capillary 148, returns oil-enriched refrigerant to the compressor 110 within the air conditioner unit 102 at a determined rate. The column of liquid refrigerant in the URMV 146 is acted on by gravity and by positioning the oil still/surge vessel 116 near the bottom of the URMV 146 column maintains a steady flow of supply liquid refrigerant to the oil still/surge vessel 116. This vessel is connected to the low-pressure liquid feed line 144 with a P-trap 150 that prevents vapor from entering the URMV 146 or the liquid refrigerant pump 120. The surge function allows excess refrigerant during the cooling period to be drained from the ice freezing/discharging coils 142 in the insulated tank 140, keeping the surface area maximized for condensing refrigerant. Physical positioning of the oil still/surge vessel 116 is a factor in its performance as a still and as a surge vessel. This oil still/surge vessel 116 additionally provides the path for return of the oil that migrates with the refrigerant that must return to the compressor 110. The slightly subcooled (cooler than the vapor-to-liquid phase temperature of the refrigerant) high-pressure liquid refrigerant that exits the oil still/surge vessel 116 flows through a mixed phase regulator 132 (thermodynamic refrigerant vapor trap) where pressure drop occurs.

As stated above, the refrigerant management unit 104 receives high-pressure liquid refrigerant from the air conditioner unit via a high-pressure liquid supply line 112. The high-pressure liquid refrigerant flows through the heat exchanger within the oil still/surge vessel 116, where it is subcooled, and connects to the mixed phase regulator 132, where the refrigerant pressure drop takes place. The use of a mixed phase regulator 132 provides many favorable functions besides liquid refrigerant pressure drop. The mass quantity of refrigerant that passes through the mixed phase regulator 132 will match the refrigerant boiling rate in the ice making coils 142 during the energy storage time period. This eliminates the need for a refrigerant level control. The mixed phase regulator 132 passes subcooled liquid refrigerant, but closes when sensing vapor (or inadequate subcooling of liquid) at its inlet. The pulsing action of the refrigerant exiting the opening and closing mixed phase regulator 132 creates a hammer effect upon the liquid refrigerant as a standing wave is produced within the closed column. This agitates the liquid refrigerant in the ice making coils 142 during the energy storage time period and enhances heat transfer as well as assists in segregating liquid and vapor phase refrigerant. The mixed phase regulator 132, in conjunction with the URMV 146, also drains the air conditioner unit 102 of liquid refrigerant keeping its surface area available for condensing. The mixed phase regulator 132 allows head pressure of an air-cooled condensing unit to float with ambient temperature. The system requires no superheat and no subcooling circuit that is mandatory with most condensing units connected to a direct expansion refrigeration device.

An adjustment to the mixed phase regulator 132 allows the refrigerant energy storage and cooling system to make ice with an average four-degree approach. The low-pressure liquid refrigerant that leaves the mixed phase regulator 132 passes through a bifurcator 130 to an eductor (or injector nozzle) located between the inlet to the URMV 146 and the upper header assembly 154 of the ice making coils 142 to assist with gravity refrigerant circulation. The bifurcator 130 reduces the pressure and the flow of the liquid refrigerant. During the refrigerant energy storage time period, the eductor creates a drop in pressure as the refrigerant leaves the bifurcator 130 thereby increasing the rate of refrigerant circulation in the ice making coils 142 and improving system performance.

The mixed phase regulator 132 also varies the flow of refrigerant in response to evaporator load. It does this by maintaining a constant pressure in the URMV 146. This allows the condensing pressure to float with the ambient air temperature. As the ambient air temperature decreases, the head pressure at the compressor 110 decreases. The mixed phase regulator 132 allows liquid refrigerant to pass but shuts down when it senses vapor. It holds the dual-phase mixture in a "trap". The liquid (being denser) is allowed to pass but starts to close when the less dense gas is passed. The vapor backs up to the condenser 111 to become further condensed into a liquid. The mixed phase regulator 132 is self regulating (once calibrated) and has no parasitic losses (adiabatic expansion). Additionally, the mixed phase regulator 132 improves the efficiency of the heat transfer in the coils of the heat exchanger by removing vapor out of the liquid and creating a pulsing action on the low-pressure side. As stated above, the mixed phase regulator 132 opens to let low-pressure liquid through and then closes to trap vapor on the high-pressure side and create a pulsing action on the low-pressure side of the regulator. This pulsing action wets more of the sub-circuit inside wall at the boiling level, which aids in the heat transfer.

The low-pressure liquid enters the URMV 146 vessel and the liquid and vapor components are separated. The liquid component fills the URMV 146 to a determined level and the vapor component is returned to the compressor of the air conditioner unit 102. In a normal direct expansion cooling system, the vapor component circulates throughout the system, reducing efficiency. With this embodiment, the vapor component is returned to the compressor 110 immediately. The column of liquid refrigerant in the URMV 146 is acted upon by gravity and has two paths during the energy storage time period. One path is to the oil still/surge vessel 116 where the rate of outflow is metered by capillary tubes 128 and 148. The second path for the column of liquid refrigerant is to the lower header assembly 156, through the ice making coils 142 and the upper header assembly 154, and back to the compressor 110 through the URMV 146. This gravity circulation in this manner is how energy is stored in the form of ice when the tank is filled with a phase-change fluid such as water. A solid column of liquid refrigerant in the URMV 146 becomes less dense in the ice making coils 142 as the refrigerant becomes a vapor. This differential maintains the gravity circulation.

Initially vapor, and later in the storage cycle refrigerant liquid and vapor, is returned to the URMV 146. The liquid returns to the column and the vapor returns to the compressor 110 within the air conditioning unit 102. Gravity circulation assures uniform building of the ice. As one of the ice making coils 142 builds more ice, its heat flux rate is reduced. The coil next to it now receives more refrigerant until it has an equal heat flux rate.

The design of the ice making coils 142 creates an ice build pattern that keeps the compressor suction pressure high during the ice build storage time period. During the final phase of the energy storage time period, a rapid formation of ice is built and the suction pressure drops dramatically. This is the full charge indication that automatically shuts off the condensing unit with an adjustable refrigerant pressure switch.

When the air conditioning unit 102 turns on during the energy storage time period, high-pressure liquid refrigerant forces the slide (piston) in the pressure operated slide valve to block the free flow of refrigerant to the load heat exchanger 122. When the energy storage system is fully charged and the air conditioning unit 102 shuts off, the mixed phase regulator 132 allows the refrigerant system pressures to equalize quickly. With the high-pressure liquid no longer pushing the slide closed, a spring returns the slide to the open position, allowing refrigerant to flow to the load heat exchanger 122 without restriction. In one embodiment, the load heat exchanger 122 is located below the energy storage system, and refrigerant flows by gravity to the flooded evaporator and operates as a thermosiphon.

In summary, when the tank is filled with water and refrigerant is circulated through the coils, the coils act as an evaporator, forming ice and storing energy during one time period. During a second time period, refrigerant circulates through the coils and melts the ice providing a refrigerant condensing function. This energy storage and discharge methodology is know as ice-on-coil, inside-melt. The time periods are determined by the end-user, a utility, or optional smart controls incorporated within or attached to the system.

The disclosed embodiment provides an efficient refrigeration apparatus that provides refrigerant based thermal energy storage and cooling. When connected to a condensing unit, the system has the ability to store energy capacity during one time period and provide cooling from the stored energy during a second time period. The system requires minimal energy to operate during either time period, and only a fraction of the energy required to operate the system during the first time period is required to operate the system during the second time period using an optional refrigerant pump.

Figure 2:
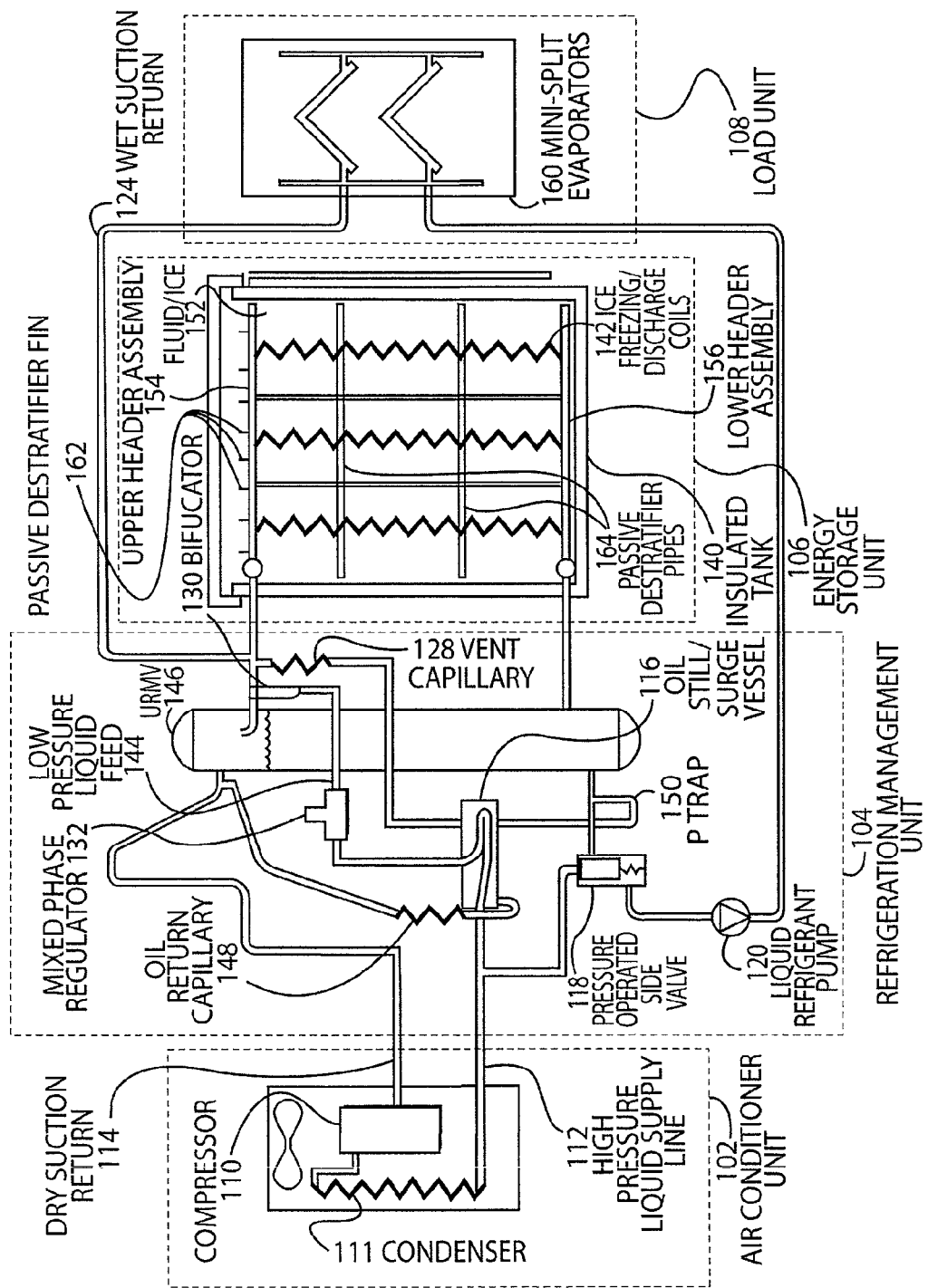
FIG. 2 illustrates an embodiment of a high efficiency refrigerant cold storage and cooling system in a configuration for air conditioning with multiple evaporators.

FIG. 2 illustrates an embodiment of a high efficiency refrigerant cold storage and cooling system in a configuration for air conditioning with multiple evaporators (which includes mini-split systems very common in Europe and the Far East). As shown in FIG. 2, various efficiency options can be added to the refrigerant cold storage and cooling system. As previously noted, a liquid refrigerant pump 120 within the refrigerant management unit 104 can be added downstream of the pressure operated slide valve 118 to circulate refrigerant to a load which is depicted as mini-split evaporators 160 in this embodiment. The coils of the heat exchangers within the mini-split evaporators 160 are fed refrigerant directly using liquid overfeed technology. In the wet suction return line 124, both liquid and vapor return to the energy storage unit 106. The vapor is condensed by discharge coils 142 within the ice 152 and the liquid refrigerant is returned to the inlet of the liquid refrigerant pump 120. Excess refrigerant that may have been utilized during the energy storage time period is now stored in the oil still/surge vessel 116. The refrigerant path options presented with the pressure operated slide valve in FIG. 2 allow both the air conditioner unit 102 and the energy storage unit 106 to provide condensing for the mini-split evaporators 160 within the load unit 108. This is called the "Push" mode and it operates during a third time period.

The pluralities of coils that comprise the ice freezing/discharge coils 142 may have a passive water destratification system consisting of passive destratifier pipes 164 in physical contact with the ice freezing/discharge coils 142 that provide a path for water displacement outside the ice boundary. These passive destratifier pipes 164, along with stays that keep the coils properly spaced provide mechanical protection for the coils during shipment. An optional air bubbler, water pump, agitator, circulator or the like can be installed to actively destratify the fluid promoting flow in either direction. Passive destratifier fins 162 may also be used on the upper header assembly 154, the lower header assembly 156 or other heat exchange surfaces within the energy storage unit 106 to provide additional destratification and heat exchange within the fluid/ice 152.

The pluralities of coils may also have a passive water destratification system consisting of pipes in physical contact with the coils that provide a path for water displacement outside the ice boundary. These pipes, along with stays that keep the coils properly spaced, provide mechanical protection for the coils during shipment. An optional air bubbler, water pump, agitator, circulator or the like can be installed to actively destratify the fluid promoting flow in either direction.

FIG. 3 is a table illustrating the component status for an embodiment of a high efficiency refrigerant cold storage and cooling system operating in three time periods and modes. As shown in FIG. 3, the status of the air conditioner unit 102, the oil still/surge vessel 116, the ice freezing/discharge coils 142 and the pressure operated slide valve 118 is depicted for each of the three time periods and modes described. For example, in time period 1, during the refrigerant cold storage mode, the air conditioner unit 102 is on, the oil still/surge vessel 116 is operating as an oil still, the ice freezing/discharge coils 142 are making ice with refrigerant flowing from bottom to top, and the pressure operated slide valve 118 is closed.

During this ice-make (charge) cycle, the air conditioner unit 102 supplies hot liquid refrigerant to the system. The circuit follows the path starting with high-pressure liquid from the condenser 111, through the mixed phase regulator 132 (float) that changes the refrigerant to a low-pressure liquid where it is fed into the URMV 146. The system feeds low temperature liquid to the lower header assembly 156 of the heat exchanger within the energy storage unit 106 where it gradually freezes most of the water in the insulated tank 140. Vapor phase refrigerant exits the upper header assembly and flows back into the URMV 146. Any carryover liquid falls to the bottom of the URMV 146 and repeats the circuit through the ice freezing/discharge coils 142. The resulting "dry" low-pressure vapor exits the URMV 146 and the cycle starts again.

In time period 2, during the cooling mode also referred to as the cooling or ice melt (discharge) cycle, the air conditioner unit 102 is off, the oil still/surge vessel 116 is operating as a surge vessel, the ice freezing/discharge coils 142 are condensing with refrigerant flowing from top to bottom, and the refrigerant pump 120 and the pressure operated slide valve 118 are open.

During peak energy periods (or at other time periods which may be advantageous to the utility company), the air conditioner unit 102 connected to the system is turned off and the system discharges the ice created during the ice-make cycle. The system discharges the energy sink provided by the ice to enable cooling. In the disclosed embodiments there are two methods of cooling cycle supported by the system module: load-shifting and load-leveling. Load-shifting makes use of a single refrigeration circuit—the system connected to a standard evaporator coil to provide both sensible and latent cooling. The load-leveling mode uses two separate refrigeration circuits to provide cooling: a sensible-evaporator circuit to provide sensible cooling (removing the heat from ventilation air); and, a separate ice-evaporator to provide latent cooling (removing the humidity). A standard air conditioner unit 102 and oversized evaporator coil (load unit 108) comprise the sensible-evaporator circuit while the second evaporator coil and the energy storage unit 106 comprise the ice-evaporator circuit. The reverse can also be accomplished in other embodiments of the load leveling system.

The refrigeration circuit in load-shifting mode and the ice-evaporator circuit in the load-leveling mode are fundamentally similar with both systems being connected to an evaporator coil (load unit 108). The difference between the two is that in load-shifting mode, the load unit 108 provides both sensible and latent cooling whereas in load-leveling, the load unit 108 provides mainly latent cooling. This allows the same basic coil design the ability to perform different functions in multiple configurations.

During the ice melt cycle, the refrigerant pump 120 is the driving force for the refrigerant to the load unit 108. A unique aspect of these systems compared to standard air-conditioning systems is that the indoor unit (air handler and load unit 108) can be as far as 150 ft from the energy storage unit 106 (normal is 80 ft max). This is possible because the oil still/surge vessel 116 acts as a liquid receiver and adjusts for the additional refrigerant liquid required to traverse long lines. Standard air-conditioning systems would starve of liquid at such distances and provide poor performance. This enables the disclosed systems to be applied to much larger building than standard split system air-conditioners.

One primary application for these types of refrigeration apparatus is in the field of load shifting peak power demands of daytime air conditioning. There are primarily two methods commonly followed to avoid high electrical demand during peak summer hours. One method is called load shedding in which compressors are shut down during peak periods and cooling is supplied by stored energy such as ice to provide cooling. The other practice is called load leveling in which a smaller compressor is operated continuously. During periods of low cooling demand, energy is stored thermally as ice and during periods of moderate demand, the small compressor unit matches the load requirement. During periods of high demand when the small compressor cannot supply the needed energy, the capacity of the system is supplemented by the melting of ice to make up the difference. The ice freezing period during low air conditioning demand may be as long as 12-14 hours, contrasting to the peak demand period which may be as short as 3 hours or as long as 10 hours.

The following describes refrigerant flow for both the load-shifting mode and the ice-evaporator circuit in the load-leveling mode. During the ice melt (discharge) cycle, the ice freezing/discharge coils in the energy storage unit 106 act like condensers, taking vapor refrigerant from the load unit 108 and condensing it. The cold liquid refrigerant (32° F.-58° F.) is circulated to the load unit 108 via a liquid refrigerant pump 120. If the load unit 108 is sufficiently close to and below the refrigeration management unit 106, the cycle could operate entirely on density differences (as a thermosiphon), thereby eliminated the need for the liquid refrigerant pump 120, and hence reducing energy consumption (increasing system efficiency). This circuit uses only low-pressure liquid and vapor refrigerant.

The steps in the ice-evaporation circuit are:
1. Liquid refrigerant is pumped out of the URMV 146 via the liquid refrigerant pump 120 to the load unit 108
2. Liquid refrigerant is boiled off in the load unit 108.
3. A mixture of vapor and liquid returns from the load unit 108 to the URMV 146 through the wet suction return 124.
4. The liquid refrigerant falls to the bottom of the URMV 146.
5. Most of the vapor refrigerant component does not enter the URMV 146, but enters the heat exchanger in the energy storage unit 106 due to the suction pressure caused by condensing refrigerant in the refrigeration sub-circuits (coils)
6. Vapor refrigerant enters the ice freezing/discharge coils 142 and condenses into a liquid at the lower header assembly 156
7. The liquid refrigerant exits the lower header assembly 156 and collects in the bottom of the URMV 146
8. The cycle repeats.

In load-shifting mode, the thermal energy unit 106 is the only cooling system using energy during prescribed peak times. Therefore, a majority of the energy use (up to 100%) can be shifted to other non-peak times. The purpose of the load-shifting function is to shift electrical demand to non-peak hours. Total demand is reduced, efficiency is increased because the air conditioning unit operates at a lower ambient temperature, and demand is shifted from peak hours to non-peak hours.

In the load-leveling mode, two separate refrigeration circuits are used to provide cooling. The first circuit is fed by other cooling systems and would preferably provide sensible cooling. The disclosed embodiments are used a part of the second refrigeration circuit, the ice-evaporator circuit. The disclosed systems provides very efficient latent cooling because they run much lower temperature (lower pressure) refrigerant thru the load unit 108 compared to most standard air-conditioning systems. The lower resultant dewpoint brings more moisture (latent energy) out of the air. Use of the system in load-leveling mode to provide the latent cooling enables the size of a sensible-only air conditioning system to be reduced. Smaller air-handling systems are also possible. Ideally, the goal is to eliminate dehumidification (latent cooling) on the first coil, and provide it entirely on the second coil. By improving the efficiency of the first refrigeration circuit and using the system to supply the cooling to the second circuit, peak demand may be reduced and overall efficiency may be improved (compared to conventional unitary air-conditioning system) depending on the cooling demand.

In the load-leveling configuration, the system can still provide the total cooling load during shoulder or winter months when the cooling load is minimal or defined by an energy management system to further minimize peak electrical demand.

Finally, in time period 3, during the "Push" mode, the air conditioner unit 102 is on, the oil still/surge vessel 116 is acting as a combination oil still and surge vessel, the ice freezing/discharge coils 142 are condensing with refrigerant flowing from top to bottom, and the refrigerant pump 120 and pressure operated slide valve 118 are open. The "Push" mode allows the compressor 110 associated with the system (to make ice) to provide cooling directly to load unit 108. This might serve any number of purposes such as: providing cooling after ice is exhausted; providing additional capacity at peak times (along with the ice); and, saving ice for later, presumably for improved cost savings.

Nominally, the timing of an ice build is calculated to address energy costs alone—e.g., the price per kWh. However, the calculation can also address the efficiency of the system at various times of night, which indirectly impacts the total energy costs. Nighttime efficiency varies with ambient temperatures and weather conditions. Nighttime temperatures typically follow a profile (of being coldest just before sunrise), and this can be used to optimize build times. However, weather forecasts and other feed forward mechanisms can also be used to optimize build time. The optimization on build-time can consider a number of additional constraints and factors as well, such as noise, convenience, maximum consumption thresholds, etc.

Ice build can also be optimized around expected cooling needs, e.g., it may be advantageous economically to not build ice if calculations or rules indicate it will not be needed (for the next cycle, or some period of time). The system need not only be configured to cool a facility, e.g., human comfort. It can provide cooling for any purpose, such as cooling another liquid in a process. The delivered capacity (rate) can be also adjusted via a valve that feeds some of the output (from liquid refrigerant pump 120, e.g.) directly back into the system, bypassing evaporator or load unit 108.

The system generates its own water from condensation, and in sufficient quantity to not require the insulated tank 140 to be refilled due to evaporation. The excess water generated through condensation may be drained through a tube leading from an elevation above the ice to the ground. To prevent this pathway from becoming a source of hot air flow into the tank, a water trap or other valve system can be placed in the tube.

The block of ice 152 formed within the insulated tank 140 is designed to melt from the top to the bottom (due to refrigerant evaporation) and from the inside of each if the ice freezing/discharge coils 142 section of ice to the outside (the ice touching the coil melts first). After all the ice touching the ice freezing/discharge coils 142 has melted, water—not ice—is in contact with the coil, although a "sheath" of water may be trapped at the top or bottom. This sheath of water slows the heat transfer rate from coil to ice. Efficiency and operating conditions are improved by circulating water through the sheath. To affect such a flow, two things must be accomplished: a complete pathway must be created along the ice freezing/discharge coils 142, from open water to open water, and a means for promoting flow must be established. To create a pathway, passive destratifier pipes 164 (thermal conductors such as copper pipe) are installed towards the bottom of the coil assembly, and physically bound to each ice freezing/discharge coil 142 along the conductor's length. Furthermore, the passive destratifier pipe 164 extends out beyond the ice build area into open water. Multiple such conductors may be added. Each conductor thus creates its own "sheath" of water which starts in open water and connects to each coil's sheath, thereby creating a pathway from the bottom up. At the top of each coil, a passive destratifier pipe 164 is again added to create another sheath that extends through the ice on the top. This conductor may be of a different design, such as four stems that extend up from the headers, or perhaps a thin conductive fin that runs the full length of each coil assembly. This method is optimized if the ice block is built with the water level in the tank such that at full build time, there is open water above the ice. (Water level rises substantially during build due to the lower density of ice, so the water level need not start above the coil assembly.) Having thus established a path of water from open water, to each coil, and out the top of the ice block, the issue of promoting water flow is addressed.

Passive and active methods can both be applied. A passive method would use the stratification in temperature and density to create a natural flow. Active systems would stimulate the flow further by introducing water bubbles in the tank, or up each coil, or by pumping water to create circulation.

Figure 4:
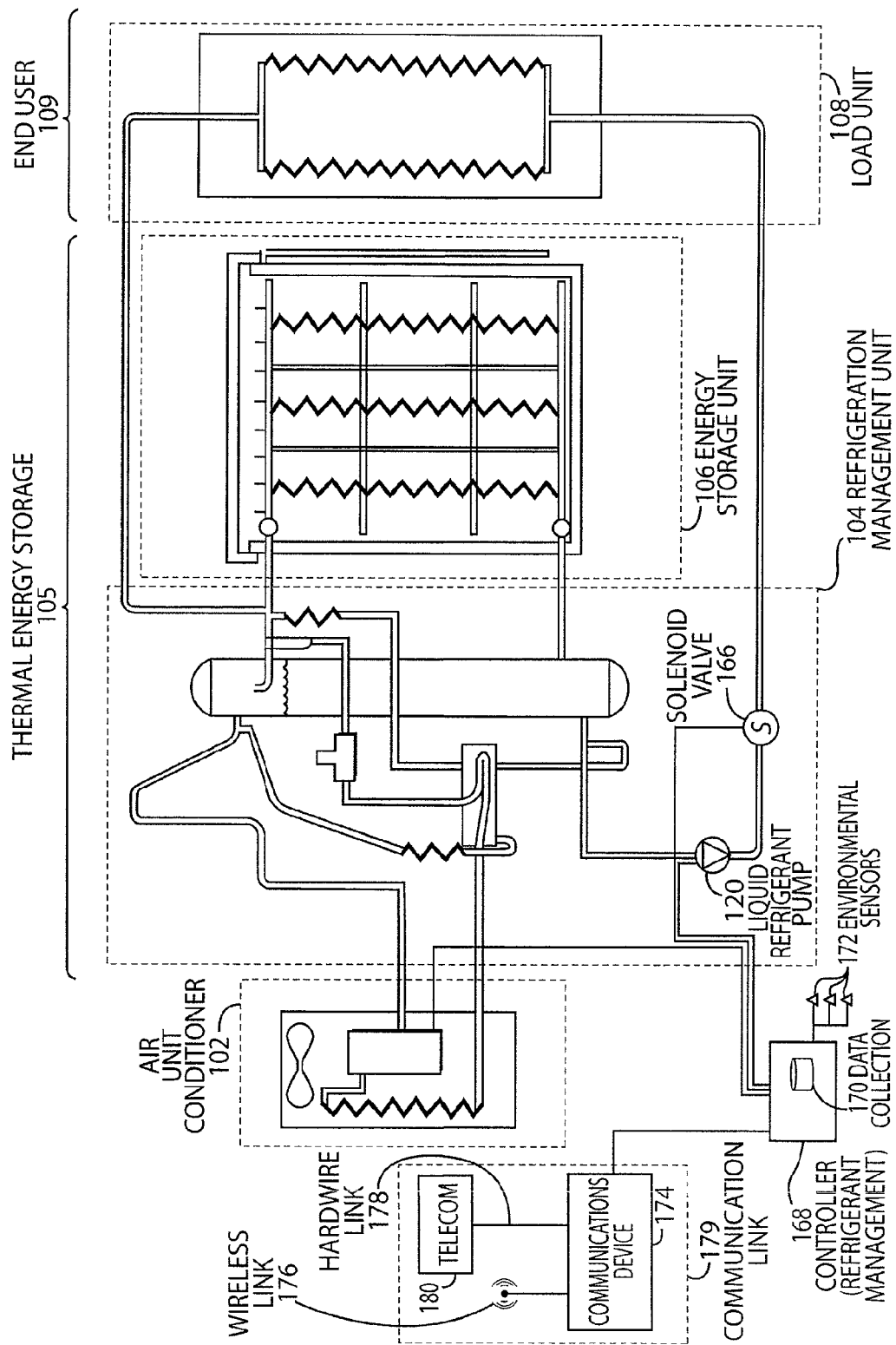
FIG. 4 is an embodiment of a refrigeration apparatus that provides energy storage and cooling with external control and environmental sensing capability.

FIG. 4 illustrates another embodiment of refrigeration apparatus used as a cold storage and cooling system using a solenoid valve 166. The solenoid valve 166 is designed to replace the pressure operates slide valve 118 of FIG. 1 and is open during the ice melt cycle and is closed during the ice make cycle. When a pressure operated slide valve is used, during the ice make cycle, the pressure in the high-pressure liquid supply line 112 from the compressor discharge is high and overcomes the spring force within the pressure operated slide valve 118. The piston within the valve is then at its farthest position which closes the inlet line to the liquid refrigerant pump 120 and prevents flow of liquid. During the ice melt cycle, the pressure on the high-pressure liquid supply line 112 is lower and the piston is at its nearest position. At this condition, both the inlet and the outlet to the valve are open and the refrigerant flows to the liquid refrigerant pump 120 and onward to the load unit 108 as shown in FIG. 1.

By removing the pressure operated slide valve 118 and the direct access line from the high-pressure liquid supply line 112, refrigerant can always flow from the URMV 146 to the liquid refrigerant pump 120, but flow is regulated by a solenoid valve 166 (in this embodiment downstream of the liquid refrigerant pump). This configuration allows the use of off-the-shelf valves and greater precision and control of flow with electronic relay based controllers instead of relying upon pressure switches to regulate flows. In an embodiment as is detailed in FIG. 4, the entire control of the energy storage device (in this embodiment a refrigeration apparatus) may be controlled by a controller 168, (in this embodiment a refrigerant management controller), and is in communication with the refrigeration management unit 104 and used to control the operation of the system. The controller 168 may be driven by a PC type board, IC chip incorporated in a form such as a programmable logic controller (PLC) or programmable microcontroller with analog, digital and relay inputs and outputs or the like. This greatly increases the flexibility of the system and reduces cost of manufacture while allowing numerous additional applications and "smart controls" for this thermal energy storage apparatus.

The controller 168 may receive real-time data and environmental information from communications with environmental sensors 172. These environmental sensors 172 may measure; climatic variables such as time, temperature, humidity (dewpoint), UV index, air quality index, carbon emissions, climate zone; condition/consumption variables such as power consumption, energy grid status, energy demand, energy consumption, cooling degree days, utility load profiles; and/or, cost variables such as power costs, electric power price, time dependent value of energy, oil price, propane price, natural gas price, day-ahead price, day-of price, electricity generation price, electricity transmission price, electricity distribution price, electric utility revenue or energy service company revenue, or a variety of other variables that might be useful in determining how and when the refrigeration apparatus should perform in response to a price event, a reliability event, or a load balancing event for example. These factors may change times, rates and specific performance issues in the ice make cycle that might optimize performance or other factors such as when noise from the unit may be a concern. The (refrigerant management) controller 168 may also contain a data collection unit 170 in which historical environmental and performance may be stored. This data could be stored external to the system for example in a Data Historian or the like, and accessed and utilized by an outside person (e.g., utility company, energy suppliers, energy service company, demand response aggregator, system operator or the like) or by the controller 168 to make performance changes to one or many units based upon historical data of the unit.

Additional communications with the controller 168 can be accomplished with a communications device 174 that would facilitate either a wireless link 176 or a hardwire link (e.g., external physical network interface or expansion interface) to a telecom 180 or network/internet (e.g., wide area network, broadband internet, power line communications (BPL), satellite, fiber optic, Bluetooth®, ZigBee®, wide area communications interface, radio broadcast data system, paging system or the like). In this way, collected historical data may be downloaded from the system or specific control functions may be programmed into the device such as weather data and forecasts, solar tables and the like. External control inputs or data can also be communicated to controller 168 based on current, typical, or predicted conditions beyond the direct sensing ability of controller 168, such as regional energy supply, cost, or consumption data. The historic data (either captured by the controller or externally derived), environmental data (past, present or forecast), weather, energy, cost, or other data which significantly impacts the efficiency or desired performance and optimization of make/melt times can be used to provide great optimization of performance of the apparatus in a multitude of application environments.

In the embodiments described herein, control of the energy storage unit (e.g. thermal energy storage unit) has been detailed as being performed by a communications link (e.g. wireless link 176 or hardwire ling 178). The ultimate control of the energy storage apparatus may be from the end-user or may be from the source of the power (e.g., the utility company or distribution network) or from a third party management entity.

In these disclosed embodiments, a wide variety of heat loads applications can be adapted in conjunction with the aforementioned systems. Essentially any cooling need that can be transferred via refrigerant piping may be utilized with these systems. For example, dairy cooling, plastic injection molding cooling, fresh catch fish refrigeration, inlet cooling for turbine power generation, watercraft refrigeration and air conditioning as well as a wide variety of process cooling applications or the like can benefit from these types of systems.

Figure 5:
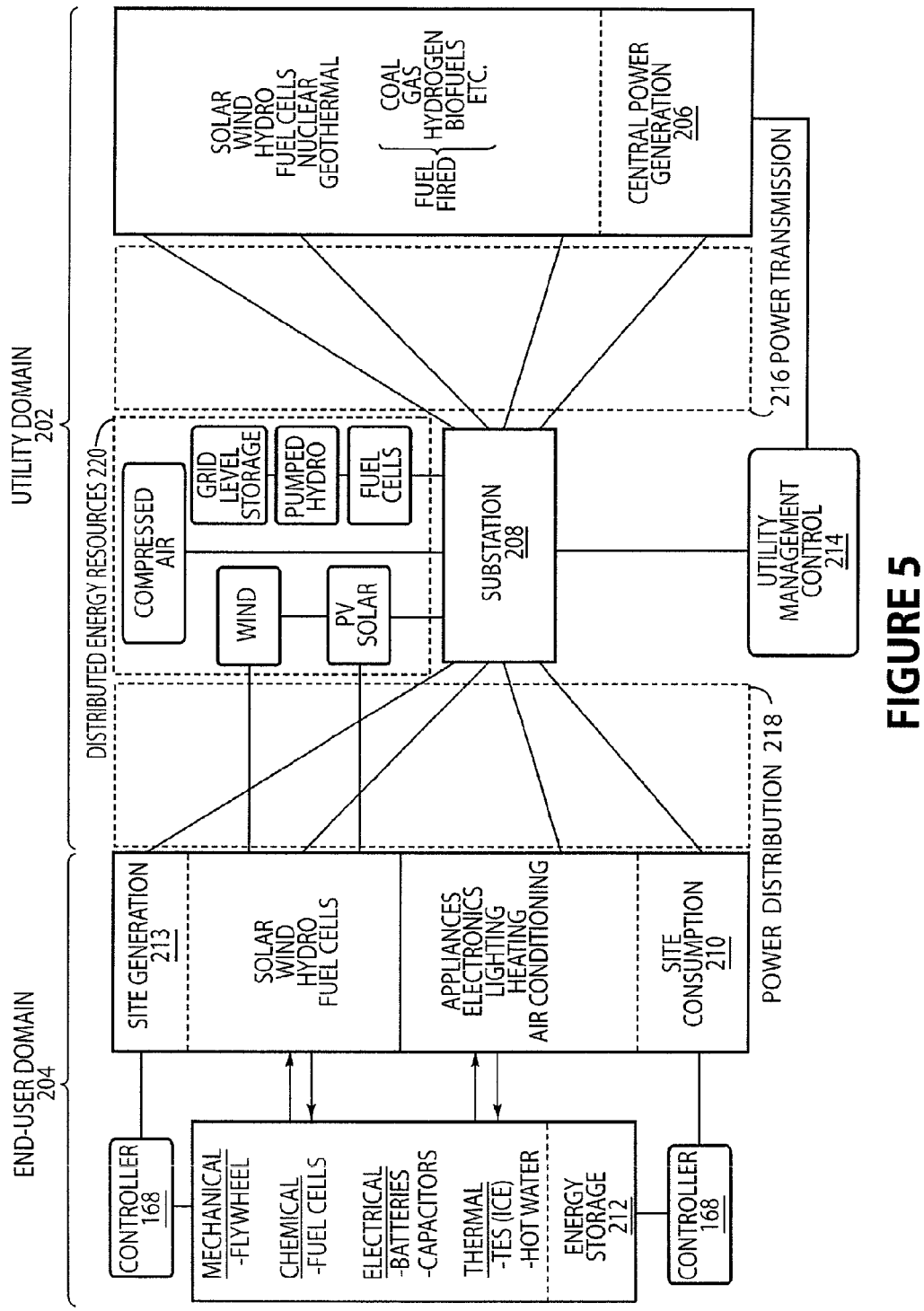
FIG. 5 illustrates an overview of power generation and distribution system with on-site energy storage and controlled by the consumption site.

FIG. 5 illustrates an overview of power generation and distribution system with on-site energy storage which is controlled by the consumption site. As can be seen in FIG. 5, conventional centralized power generation 206, which may be a power station, generating station, power plant powerhouse or any other facility for the generation of power is used to generate electricity. This electrical power generation 206, whether it be fuel fired generation (e.g., coal, gas, hydrogen, biofuels etc.), solar, wind, hydroelectric, fuel cells, nuclear, geothermal or the like, is transmitted (normally at high voltage e.g., 110 kV or above), often over long distance through overhead power transmission lines to the substation 208 via power transmission 216 where voltage is transformed from high to low or the reverse using transformers (not shown). Electric power may flow through several substations 208 between power generation and the consumer, and may be changed in voltage in several steps. The electricity is then transferred from the substation 208 to the end-user or consumer for site consumption 210 by power distribution 218.

In combination with the centralized power generation 206, distributed generation or distributed energy resources 220 can be utilized and often use a larger number of smaller generators throughout the electricity network. Some of these distributed energy resources 220 use waste heat from industrial processes, others use fuels or other techniques that would otherwise be wasted, such as landfill gas. Additionally, wind, solar, grid level storage, pumped hydro, fuel cells and the like are all generation sources that tend to be distributed in this manner because of the low density of the natural energy they collect.

This power generation, transmission and distribution network is utilized for industrial, commercial and residential end-users. Whereas the following embodiments depicted and described in FIGS. 5-11 illustrate a residential model, it is implicit that these embodiments are to be considered as an exemplification of the principles of the invention and is not to be limited to the specific residential applications described and also include additional applications such as industrial and commercial consumption sites.

In a typical residential situation, the site consumption 210 is electric power and is consumed by conventional devices such as appliances, electronics, heating, lighting, air conditioning and the like. In order to make the dwelling more economical and ecological, new techniques and devices have been implemented to control the operation of these energy consuming devices. These have taken the form of anything from programmable thermostats to utility managed direct load control programs. These programs offer bill credits in exchange for allowing the utility to install a switch on the consumer's air conditioner or electric water heater that allows the utility to turn off or "cycle" the appliances for brief periods during peak electricity demand times.

In addition to the typical site consumption 210, many end-users have turned to site generation 213 to augment or offset the power distribution 218 needed for the particular site consumption. In these instances, the end-users have installed generation devices such as solar (e.g., active, passive photo electric [PE]), wind generation, hydroelectric, fuel cell or the like at the end-user site. Often times the generation of this energy is beyond the consumption capacity of the site and energy storage 212 methods and devices are utilized to store this excess or unutilized power. One common example of this type of storage is utilizing active or passive solar energy that stored in the form of a hot liquid or solid during the peak daylight hours and utilized at night for heating the dwelling. This energy storage 212 which may be in many forms, such as: mechanical (e.g., flywheels); chemical (e.g., fuel cells); electrical (e.g., batteries or capacitors); and, thermal (e.g., thermal energy storage [TES] or hot water) is controlled by the end-user with the use of a controller 168 that allows proper utilization of the stored energy for site consumption 210 by the consumer. In this conventional model the power generation 206, power transmission 216, substation with ancillary distributed energy resources 220 and power distribution 210 are under the utility domain 202 and are controlled by the electric utilities which may include investor owned, publicly owned, cooperatives, and nationalized entities which are regulated in the U.S. by local and national authorities. The site consumption 210, site generation 213, and energy storage 212, as well as the control (controller 168) of the storage, are in the end-user domain 204 and are controlled by the owner or manager of the facility or dwelling. It is the end-user who ultimately makes the decisions of if and when energy storage 212 is utilized. With the few exceptions, such as utility managed direct load control programs, the consumer has been in complete control of the site consumption 210. These direct load control programs have had very limited success due to the fact that they operate by depriving the consumer of services in the times when they are needed most.

Figure 6:
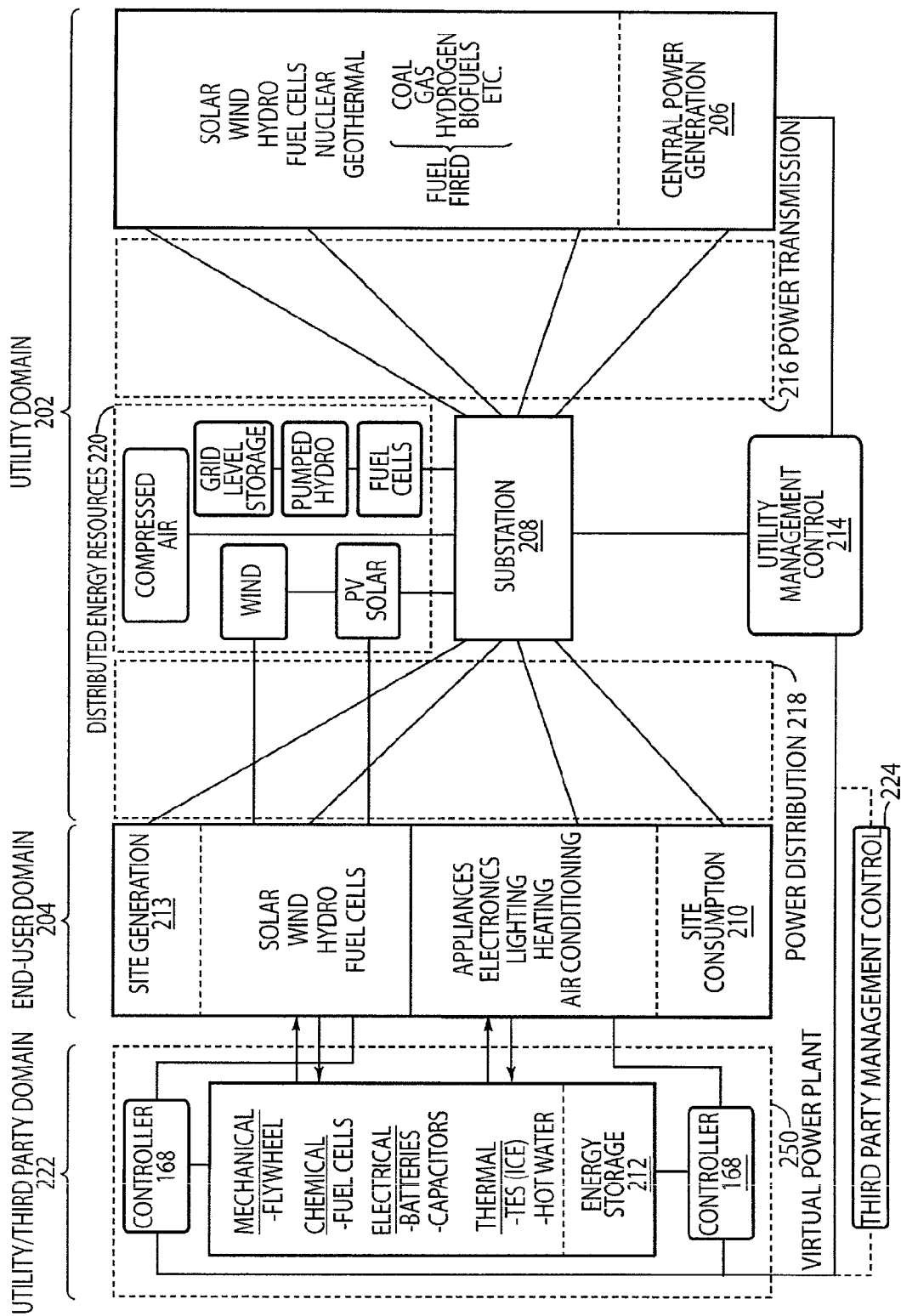
FIG. 6 illustrates an overview of power generation and distribution system with on-site energy storage and power input controlled by the utility or a third party manager.

FIG. 6 illustrates an overview of power generation and distribution system with on-site energy storage and power input controlled by the utility or a third party manager. As is detailed in FIG. 6, conventional centralized power generation 206 is used to generate electricity that may be transmitted through overhead power transmission lines to the substation 208 via power transmission 216 where voltage is transformed from high to low or the reverse using transformers (not shown). The electricity is then transferred from the substation 208 to the end-user or consumer for site consumption 210 by power distribution 218. In this particular embodiment, power passing through the substation 208 is monitored, managed and controlled by utility management control 214. The utility management control 214 also is in communication with controllers 168 which handles the energy storage 212 and manages the interface between the energy storage 212 and the site consumption 210.

In this embodiment, the energy storage 212 is monitored, managed and controlled by the utility management control 214 and is not controlled by the end-user as in the embodiment of FIG. 5. Thus, the end-user domain 204 is now limited to the site consumption 210 and the site generation 213 and the utility domain 202 is expanded from power generation 206, power transmission 216, substation 208 with ancillary distributed energy resources 220 and power distribution 210, and additionally encompasses the utility/third party domain 222 which includes the energy storage 212 and the controllers 168 which now acts as a virtual power plant 250 which may act invisibly to the end consumer. Additionally, or in lieu of the utility management control 214, the virtual power plant 250 may be monitored, managed and controlled by a third party management control 224 which acts as a separate entity from the utility management control 214. This allows the utility to maintain control in a conventional manner over the utility domain 202 without engaging in additional monitoring, management or control of the virtual power plant 250. As in the embodiment of FIG. 5, distributed generation or distributed energy resources 220 can be utilized in combination with the central power generation 206 in a manner which is integrated at the device level, functionally invisible to the end-user and does not impose denial or curtailment of services when the central power generation 206 is taxed or insufficient to provide power to its customer base. The end-user thereby controls cooling, without knowledge or consideration of the impact on the utility, and at the same time, the utility manages the source of energy which is delivered, without knowledge or consideration of the end-user's energy demand (e.g., A/C control) decisions.

The system of this embodiment is not burdened with complex communication, safety, control, and security issues and interfaces well with conventionally available devices such as smart meters, programmable communication thermostats, remedial action schemes, local generation and the like and avoids management and compatibility issues, as a system which operates behind the power meter of the end-user. From a utility management standpoint, a power plant possesses basic key features such as the ability to supply electrical power on-demand, a control program structure and a data historian. The virtual power plant 250 of the detailed embodiments mimics these basic key features and provides utility managers with the ability to supply electrical power on-demand, a control program structure and a data historian. Thus, from the standpoint of the utility manager, the virtual power plant 250 is designed to look and behave and react like any other power plant resource but in this case the power is being drawn from storage based at the end-user 109 site, on the other side of the power meter.

For the purposes of illustration of this particular embodiment, the utility manager is described as an entity which analyzes utility and customer needs and then directs the controller to implement specific commands that control the operation of the energy storage unit 212 and/or virtual power plant 250. Not by way of limitation of this example, the utility manager may also be a third party manager which is not specifically part of the utility (such as a contracted service provider), or the utility manager may be a set of programmable logic circuits which manage the aforementioned operations on an automatic or pre-programmed basis in response to utility conditions and circumstances. These programmable logic circuits may be located and exist anywhere within the system, and are not limited in scope to any part of the system hardware. For example, the programmable logic circuits may be incorporated into the controller 168 thereby allowing the virtual power plant 250 to be managed locally.

In a typical residential or commercial situation, the site consumption 210 is electric power and is consumed by conventional devices. Instead of allowing the utility to install a switch on the consumer's air conditioner or electric water heater that allows the utility to turn off or "cycle" the appliances for brief periods during peak electricity demand times, complete management of the energy storage 212 and thus the virtual power plant 250 is performed by either utility management control 214 and/or third party management control 224. In this instance, the consumer is not being denied use of the appliance during a period when it may be needed most. Instead, energy that is being supplied to the site consumption 210 is monitored, managed and controlled such that the site consumption 210 is uninterrupted and such that this control (utility management control 214 and/or third party management control 224) is functionally invisible or unnoticed from a comfort and control standpoint by the end consumer.

The energy storage 212 may be provided in a variety of ways including drawing alternating current (AC) electric power during off-peak instances, converting the alternating current electric power into another non-AC form of energy such as thermal (e.g., heat, cold, ice or the like), mechanical (e.g., flywheel, pumped hydro, compressed gas or the like), direct current (DC) electrical (e.g., batteries, capacitors or the like), chemical (e.g., fuel cells hydrolysis or the like) and storing the energy for utilization during peak demand. As detailed in the embodiments of FIGS. 1-4, thermal energy storage 105 can be managed to provide stored thermal energy to an end-user during these periods of peak demand. For example, the site consumption 210 or end-user needs cooling that is provided by refrigerant based conventional air conditioning. This cooling demand is commonly in addition to a variety of lighting and appliances that are drawing power concurrently but typically the power draw of a typical residential end-user can be biased by air conditioning by as much as 80%. Because as much as 50% of the entire power grid can be drawn by air conditioning, utilities have become more and more strained by their ability to provide electrical power during periods of peak demand. Thus, TES is a model of storage which can impact the ability of utility systems to manage peak demand power periods.

Energy storage 212 (e.g., TES) is controlled by the utility management control 214 and/or third party management control 224 with the use of a controller 168 that allows proper utilization of the stored energy for site consumption 210 by the consumer. While the site consumption 210 and site generation 213 remain in the end-user domain 204, the energy storage 212 as well as the control (controller 168) of the storage are in the utility/third party domain 222. The utility and/or third party manager ultimately make the decisions regarding if, when as well as to what extent the energy storage 212 is charged and utilized and based upon environmental conditions are optimal for the utility. Thus, the energy storage 212 which is located in proximity of said end-user, receives alternating current electrical energy from the electric utility. It converts the alternating current electrical energy into another form of energy, and stores the converted energy in a time period that may be most beneficial to the utility (either for production reasons such as [outside] environmental temperature or load [demand shifting] reasons). The energy storage 212 is then capable of supplying this converted energy to the end-user to reduce the end-user's demand for alternating current electrical energy in a later time period. This allows the system to reduce the end-user's demand (thereby effectively increasing the output of the central power generation 206) without having to convert the stored energy back to alternating current electric power.

In this example, the consumer is not denied service and may not know if the energy being consumed at the site is from power distribution 218 or the virtual power plant 250. In addition the control and management functions of the controller 168 and environmental sensors 172, which are linked to the utility or third party manager, the system may be used to diagnose and monitor the operation of the subsystems and devices within the system. The disclosed embodiments are versatile and allow for monitoring and reaction to the sensor or historical data in time frame which are seasonal to instantaneous.

The disclosed systems additionally allow simple and seamless integration with computerized system monitoring and control systems such as Supervisory Control and Data Acquisition (SCADA) and Distributed Control Systems (DCS) which may be industrial, infrastructure or facility based. With this type of architecture the supervisory control of the virtual power plant 250 allows the utility or third party manager to define standard energy storage operations and gives the ability to modify control strategies monthly, weekly, daily, or hourly or ant any other time period beneficial to the utility. This system may provide an interface as per each utility's needs allowing data acquisition and connects securely and seamlessly to computer servers, portals and internets and intranets. In this way the utility middleware may be bypassed thereby reducing risk, constraints, complexity, and time.

In the disclosed systems, the entity responsible for controlling and managing the performance of the electrical supply (e.g., at the central power generation 206, third party management control 244 or the like) may see a need for increased power demand due to increases in air conditioning demand from the end-user 109. The power manager or an automated system may react to the current conditions by increasing supply of power within the system. In this embodiment, the power manager reacts with control decisions that govern directly or indirectly the source of the energy that is driving the cooling being demanded by the end-user 109. These control decisions that are carried by communications link 177 can be structured within the same control and communications network that handles conventional SCADA or DCS signals or the control decisions may be handled by a completely separate and independent network or any combination of the two. Once a performance command is received or initiated by the controller in response to the demand, the controller 168 responds by supplying cooling to the end-user 109 with the TES 105. In this example, the end-user does not necessarily know whether the cooling is being generated by the air conditioner 105 or by cooling stored in the TES 105, and in all likelihood does not care. The utility manager decides and directs how cooling is delivered to the customer, while the customer directs and controls when and how much cooling is needed. Thus, the utility controls the supply (either transmitted or stored) and makes power decisions on a system that acts like a power plant (virtual power plant 250), and the end-user 109 controls the asset (cooling within the dwelling) and makes comfort decisions on a system that acts like an air conditioner. The disclosed systems act to broker the needs of the utility and end-user by creating, managing and controlling the interface between these two entities.

Figure 7:
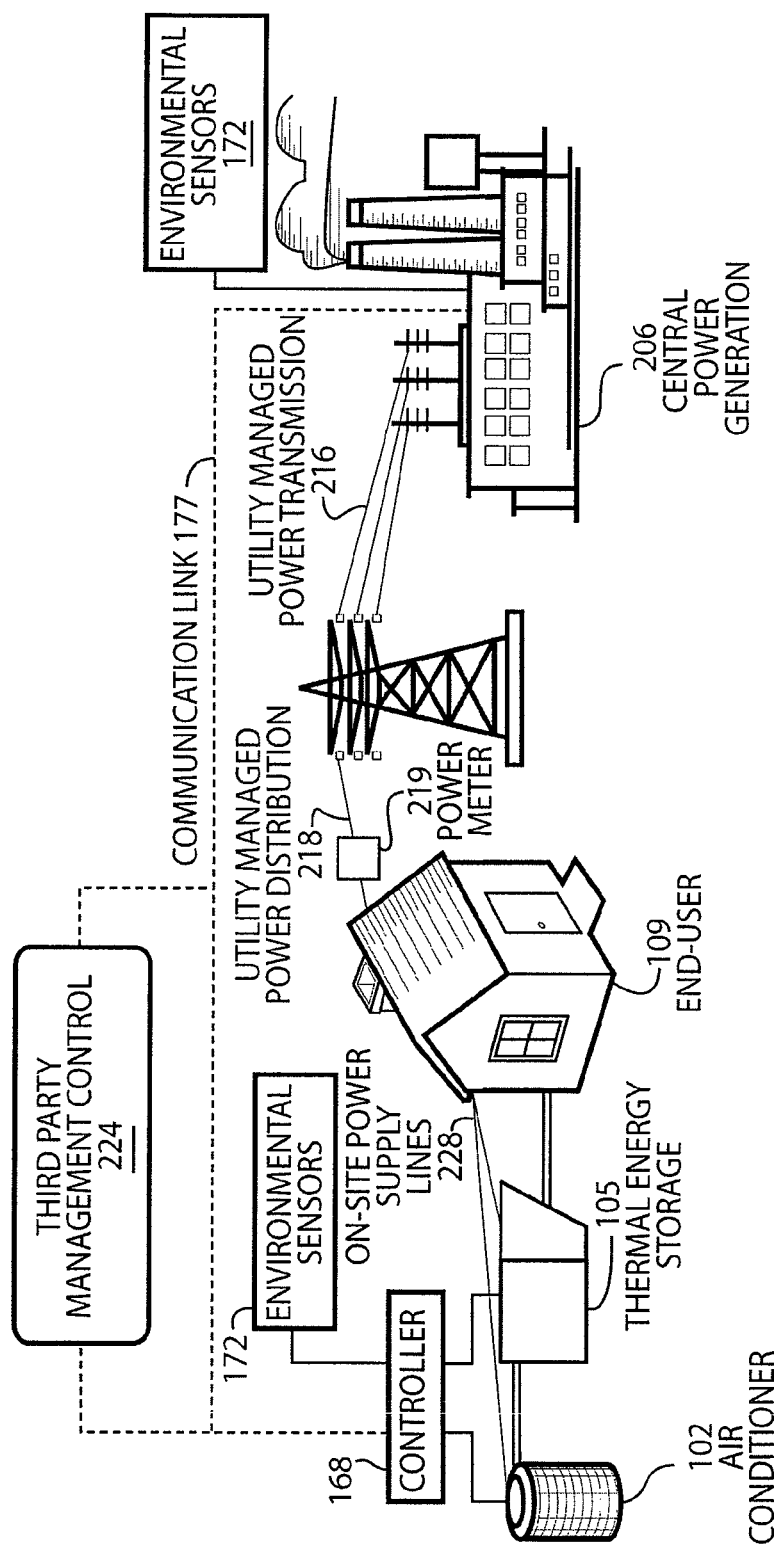
FIG. 7 illustrates an embodiment of power generation and distribution system with on-site thermal energy storage and power input to a single user controlled by the utility or a third party manager.

FIG. 7 illustrates an embodiment of power generation and distribution system with on-site thermal energy storage and power input to a single user controlled by the utility or a third party manager. In this embodiment, electricity from the central power generation 206 is delivered to the end-user 109 via the utility managed power transmission 216 and the utility managed power distribution 218 through the power meter 217 at the end-users site. In this example, a thermal energy storage unit 105 (such as that detailed in FIGS. 1, 3 and 4) is used to provide energy storage 212 to the end-user 109 by supplementing and or replacing the cooling supplied to the dwelling by an air conditioner 102. In this example, both the air conditioner 102 and the thermal energy storage unit 105 are located in proximity (within the near vicinity e.g., on site or within 1000 feet) to the end-user 109 and are supplied with power from the dwelling by on-site power supply lines 228 although either or both of these devices may receive power from any other source such as the central power generation 206, distributed energy resources 220, site generation 213 or the like.

Environmental sensors 172, such as those outlined in the embodiment of FIG. 4 may be used by the utility or a third party manager to assess the environment of the electrical power generation, distribution, management and utilization. The utility or a third party manager may receive real-time data and environmental information from communications with these environmental sensors 172 which may detail; climatic variables such as time, temperature, humidity (dewpoint), UV index, air quality index, carbon emissions, climate zone or the like; condition/consumption variables such as power consumption, energy grid status, energy demand, energy consumption, cooling degree days, utility load profiles or the like; and/or, cost variables such as power costs, electric power price, time dependent value of energy, oil price, propane price, natural gas price, day-ahead price, day-of price, electricity generation price, electricity transmission price, electricity distribution price, electric utility revenue or energy service company revenue or the like, or a variety of other variables that might be useful in determining how and when the energy storage 212 (in this case the thermal energy storage 105) should perform in response to a price event, a reliability event, or a load balancing event for example. These factors may change times, rates and specific performance issues in the energy storage 212 that might optimize performance or other factors such as when noise from the unit may be a concern. The utility or third party manager may also collect data on historical environments and performance to make performance or utilization changes based upon historical data.

Communications from the central power generation 206 to the controller 168 can be accomplished with a communications link 177 which may be a wireless or hardwire link (e.g., external physical network interface or expansion interface), a telecom or network/internet (e.g., wide area network, wide area communications interface, radio broadcast data system, paging system) or the like. In this way, collected historical data may be downloaded from the system or specific control functions may be programmed into the device such as weather data and forecasts, solar tables and the like. External control inputs or data can also be communicated to the controller 168 based on current, typical, or predicted conditions beyond the direct sensing ability of controller 168, such as regional energy supply, cost, or consumption data. The historic data (either captured or externally derived), environmental data (past, present or forecast), weather, energy, cost, or other data which significantly impacts the efficiency or desired performance and optimization of the energy storage 212 can be used to provide great optimization of performance of the apparatus in a multitude of application environments.

As an example, the weather for a particular region where a central power generation 206 facility is operating may be extremely and unseasonably warm. Weather forecasts predict continued elevated temperature for the next few days with high levels of sunshine and a high UV index. Historical analysis of data received from environmental sensors 172 compared to real-time analysis of the environmental sensors 172 suggests that the electrical power grid will be under extreme stress due to the utilization of commercial and residential air conditioning between the hours of noon and 6:00 PM the next day. In response to this predicted demand, the utility or third party manager may act to boost storage during the night (low demand) to assist in offsetting this potentially detrimental situation. This may be done by the communications link 177 from either the central power generation 206 or the third party management control 224 who links to the controller 168 located on the downstream side of the power meter 219. This link may be through an internet connection or web portal with each individual controller 168 having its own IP address with the ability to undertake 2-way communication with the controlling manager and/or data collection, storage and retrieval system (e.g., database, Data Historian or the like). Thus, by utilizing the stored energy, and managing the optimal conditions for producing and delivering the stored energy to the end-user 109, peak demand can be reduced significantly on the central power generation 206, in a way that the end-user 109 does not realize an interruption or change in power or cooling at the point of consumption of the energy. This model demonstrates a utility driven, disaggregated distributed energy storage system where the distributed energy resource is designed to behave as a virtual power plant. In this instance the end-user 109 may be treated individually, and not as an aggregate. The utility may rely upon the environmental sensors and historical data to establish a demand profile, and then generate a demand response to optimize the performance of the entire system of generation, transmission, distribution and storage of power.

Figure 8:
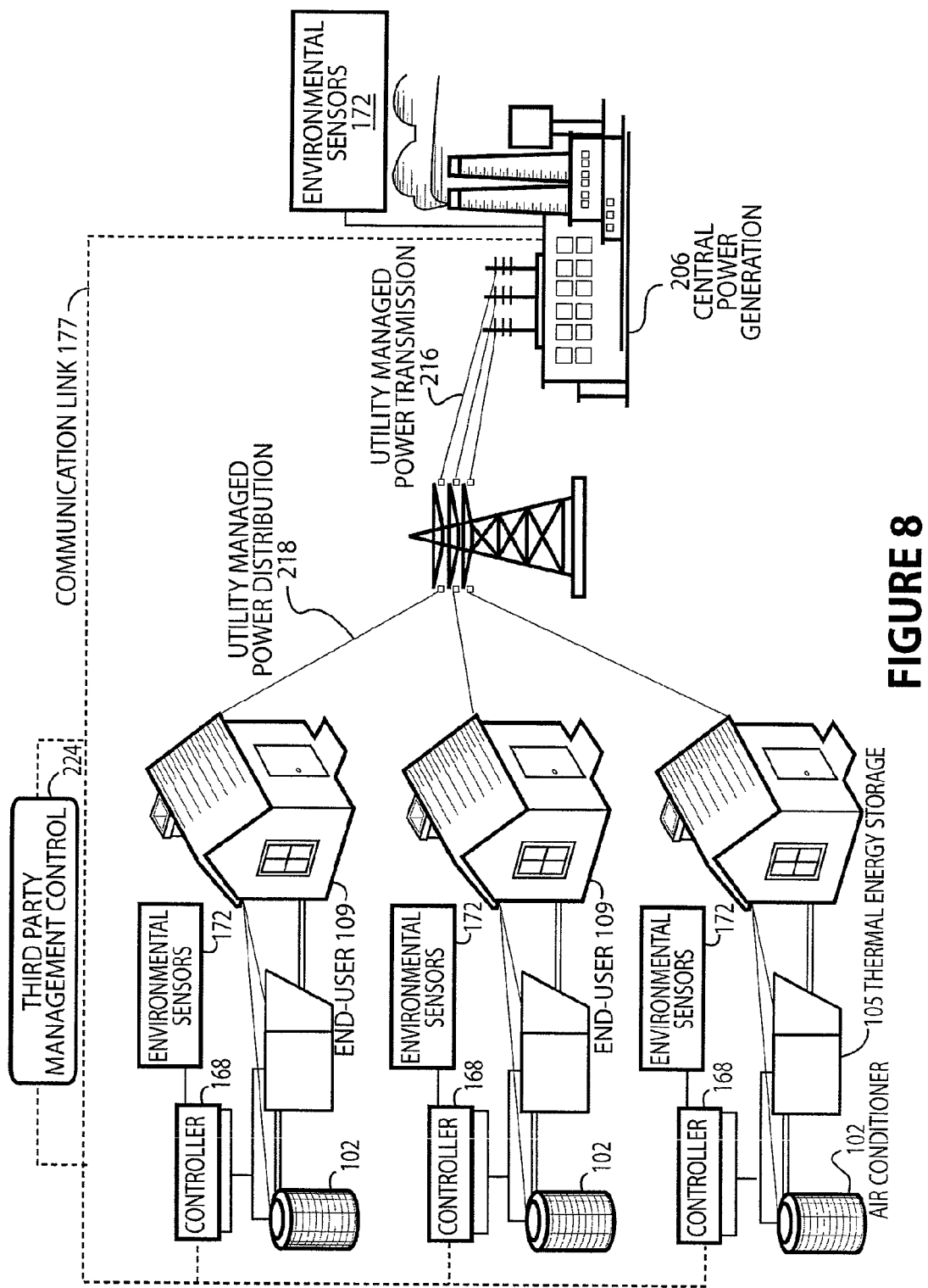
FIG. 8 illustrates an embodiment of power generation and distribution system with thermal energy storage to a plurality of users controlled by the utility or a third party manager.

FIG. 8 illustrates an embodiment of power generation and distribution system with thermal energy storage to a plurality of users controlled by a utility or a third party manager. In this embodiment, electricity from the central power generation 206 is delivered to a plurality of end-users 109 via the utility managed power transmission 216 and the utility managed power distribution 218. In this example, a plurality of thermal energy storage units 105 (such as that detailed in FIGS. 1, 3 and 4) are used to provide energy storage 212 to each of the end-users 109 by supplementing and or replacing the cooling supplied to the dwelling by the air conditioners 102.

Environmental sensors 172, such as those outlined in the embodiment of FIG. 4 and FIG. 7 may be used by the utility or a third party manager to assess and/or predict the environment of the electrical power generation, distribution, management and utilization. The utility or a third party manager may receive real-time data and environmental information from communications with these environmental sensors 172 which may detail; climatic variables such as time, temperature, humidity (dewpoint), UV index, air quality index, carbon emissions, climate zone or the like; condition/consumption variables such as power consumption, energy grid status, energy demand, energy consumption, cooling degree days, utility load profiles or the like; and/or, cost variables such as power costs, electric power price, time dependent value of energy, oil price, propane price, natural gas price, day-ahead price, day-of price, electricity generation price, electricity transmission price, electricity distribution price, electric utility revenue or energy service company revenue or the like, or a variety of other variables that might be useful in determining how and when the energy storage 212 (in this case the thermal energy storage 105) should perform in response to a price event, a reliability event, or a load balancing event for example. These factors may change times, rates and specific performance issues in the energy storage 212 that might optimize performance or other factors such as when noise from the unit may be a concern. The utility or third party manager may also collect data on historical environments and performance to make performance or utilization changes based upon historical data.

Communications from the central power generation 206 to the controller 168 can be accomplished with a communications link 177 which may be a wireless or hardwire link (e.g., external physical network interface or expansion interface), a telecom or network/internet (e.g., wide area network, wide area communications interface, radio broadcast data system, paging system) or the like. This communications link 177 may be in conjunction with, or replaced by, a third party management control 224 which may act to manage the system in cooperation or in lieu of the utility. In this way, collected historical data may be downloaded from the system or specific control functions may be programmed into the device such as weather data and forecasts, solar tables and the like. External control inputs or data can also be communicated to the controller 168 based on current, typical, or predicted conditions beyond the direct sensing ability of controller 168, such as regional energy supply, cost, or consumption data. The historic data (either captured or externally derived), environmental data (past, present or forecast), weather, energy, cost, or other data which significantly impacts the efficiency or desired performance and optimization of the energy storage 212 can be used to provide great optimization of performance of the apparatus in a multitude of application environments.

As an example, the weather for a particular region where a central power generation 206 facility may be extremely and unseasonably warm. Weather forecasts predict continued elevated temperature for the next days with high levels of sunshine and a high UV index. Historical analysis of data received from environmental sensors 172 compared to real-time analysis of the environmental sensors 172 suggests that the electrical power grid will be under extreme stress due to the utilization of commercial and residential air conditioning between the hours of noon and 6:00 PM the next day. In response to this predicted demand, the utility or third party manager may act to boost storage during the night (low demand) to assist in offsetting this potentially detrimental situation. Additionally, the response may also choose to target the timing of the ice make of the thermal energy storage 105 to coincide with for example, increased winds in the environmental region thereby bringing wind turbine energy from the distributed energy sources 220 into play. Thus, by utilizing the stored energy, and managing the optimal conditions for producing and delivering the stored energy to the end-user 109, peak demand can be reduced significantly on the central power generation 206, in a way that the end-user 109 does not realize an interruption or change in power or cooling at the point of consumption of the energy. This model demonstrates a utility driven, disaggregated distributed energy storage system where the distributed energy resource is designed to behave as a virtual power plant. In this instance the end-user 109 may be treated individually, and not as an aggregate. The utility may rely upon the environmental sensors and historical data to establish a demand profile, and then generate a demand response to optimize the performance of the entire system of generation, transmission, distribution and storage of power.

Figure 9:
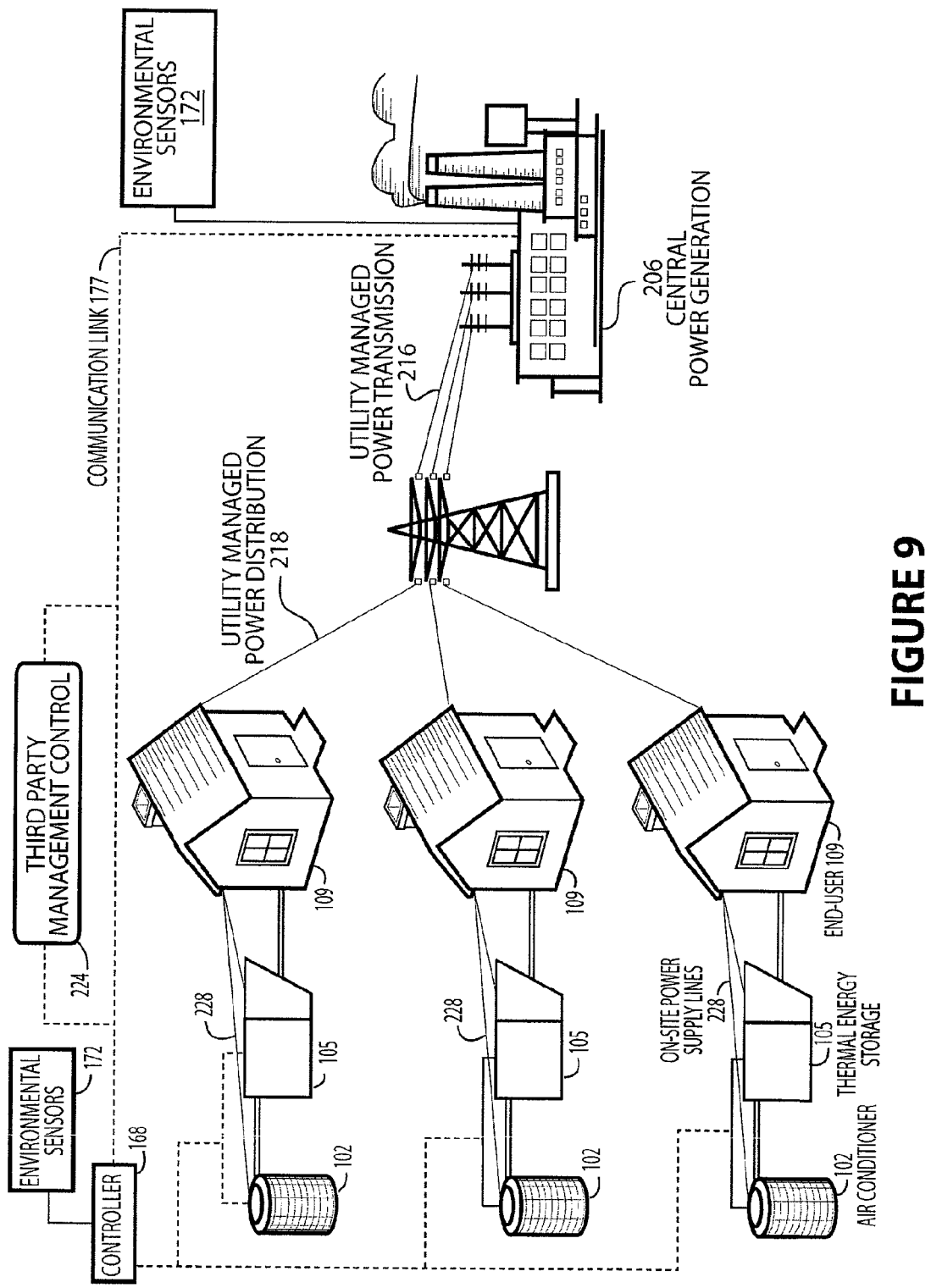
FIG. 9 illustrates an embodiment of power generation and distribution system with thermal energy storage to a plurality of users controlled by the utility or a third party manager.

FIG. 9 illustrates an embodiment of power generation and distribution system with thermal energy storage to a plurality of users controlled by the utility or a third party manager. In this embodiment, electricity from the central power generation 206 is delivered to a plurality of end-users 109 via the utility managed power transmission 216 and the utility managed power distribution 218. In this example, a plurality of thermal energy storage units 105 (such as that detailed in FIGS. 1, 3 and 4) are used to provide energy storage 212 to each of the end-users 109 by supplementing and or replacing the cooling supplied to the dwelling by the air conditioners 102.

Environmental sensors 172, such as those outlined in the embodiment of FIG. 4 and FIG. 7 may be used by the utility or a third party manager to assess and/or predict the environment of the electrical power generation, distribution, management and utilization. In this embodiment, communications from the central power generation 206 to the controller 168 can be accomplished with a communications link 177 which as in the previous embodiments may be a wireless or hardwire link, a telecom or network/internet or the like. This communications link 177 may be in conjunction with, or replaced by, a third party management control 224 which may act to manage the system in cooperation or in lieu of the utility. In this particular embodiment, a central controller 168 manages a plurality of TES units 105. Thus, a network of end-users 109 may be managed by a single controller 168 thereby simplifying and centralizing the management of the virtual power plant 250 into discrete end-user subunits which may be on the level of two end-users to individual business parks, neighborhoods, boroughs, municipalities, towns, cities, counties or regions.

In this way, specific clusters of end-users may be grouped with similar energy needs and managed as a single entity. External control inputs or data can also be communicated to the single controller 168 to affect the efficiency or desired performance and optimization of the energy storage 212 units as a cluster thereby providing even greater optimization of performance in a multitude of application environments.

Figure 10:
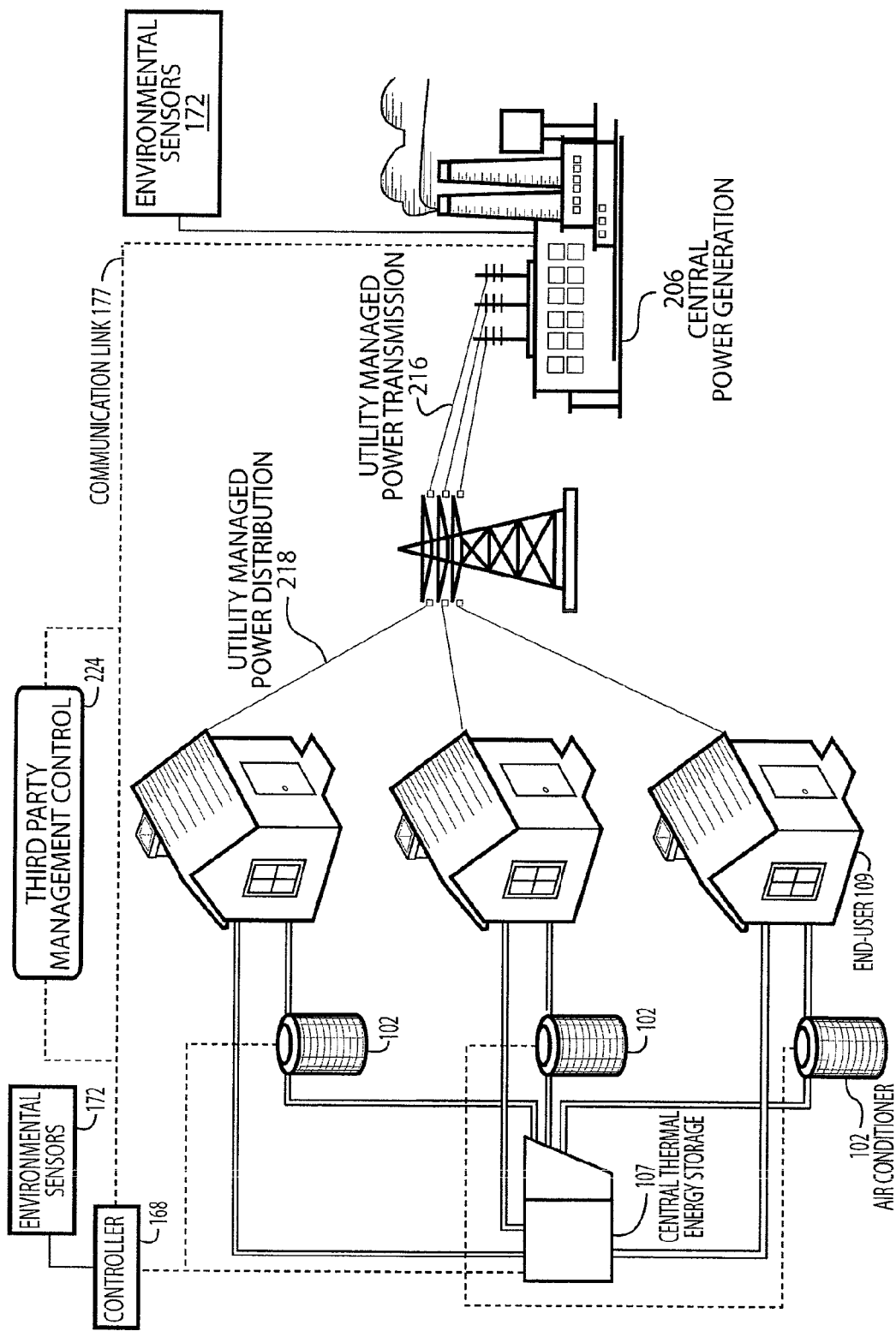
FIG. 10 illustrates an embodiment of power generation and distribution system with centralized thermal energy storage to a plurality of users controlled by the utility or a third party manager.

FIG. 10 illustrates an embodiment of power generation and distribution system with centralized thermal energy storage to a plurality of users controlled by the utility or a third party manager. As with the previous embodiments of FIGS. 7, 8, and 9, electricity from the central power generation 206 is delivered to a plurality of end-users 109 via the utility managed power transmission 216 and the utility managed power distribution 218. In this example, a central thermal energy storage unit 107 (such as that detailed in FIGS. 1, 3 and 4) is used to provide energy storage 212 to a plurality of the end-users 109 by supplementing and or replacing the cooling supplied to the dwelling by the air conditioners 102.

Environmental sensors 172, such as those outlined in the embodiment of FIG. 4 and FIG. 7 may be used by the utility or a third party manager to assess and/or predict the environment of the electrical power generation, distribution, management and utilization. In this embodiment, communications from the central power generation 206 to the controller 168 can be accomplished with a communications link 177 which as in the previous embodiments may be a wireless or hardwire link, a telecom or network/internet or the like. This communications link 177 may also be in conjunction, with or replaced by, a third party management control 224 which may act to manage the system in cooperation or in lieu of the utility. In this particular embodiment, a central TES unit 107 is controlled managed by a controller 168. Thus, a network of end-users 109 may be managed by a single controller 168 controlling a single central TES unit 107 thereby simplifying and centralizing the energy storage 212 of the virtual power plant 250 into discrete subunits. These central TES units 107 may supply thermal energy to as few as two end-users and may rely on larger units to supply individual business parks small neighborhoods or the like.

In this way, specific clusters of end-users may be grouped with similar energy needs and managed as a single entity with a single TES unit 107. External control inputs or data can also be communicated to the single controller 168 to affect the efficiency or desired performance and optimization of the energy storage 212 unit as a cluster thereby providing even greater optimization of performance in a multitude of application environments.

Figure 11:
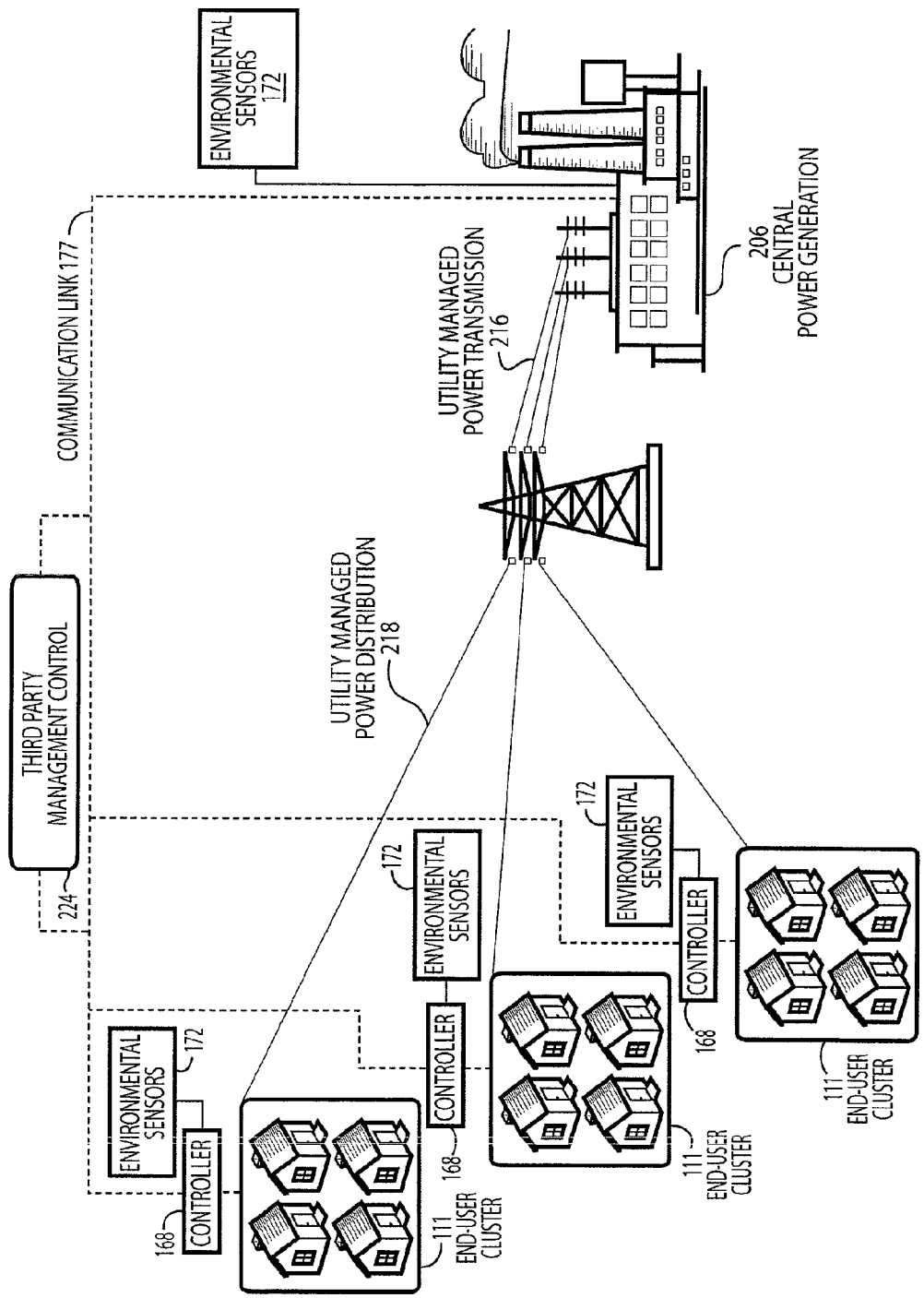
FIG. 11 illustrates an embodiment of power generation and distribution system with thermal energy storage to a plurality of user clusters controlled by the utility or a third party manager.

FIG. 11 illustrates an embodiment of power generation and distribution system with thermal energy storage to a plurality of user clusters controlled by the utility or a third party manager. As with the previous embodiments of FIGS. 7-10, electricity from the central power generation 206 is delivered to end-users clusters 111 (which may comprise pluralities of end-users 109 or individual business parks, neighborhoods, boroughs, municipalities, towns, cities, counties or regions) via the utility managed power transmission 216 and the utility managed power distribution 218. In this example, energy storage 212 (i.e., TES) is used to provide a virtual power plant 250 to an end-user cluster by supplementing and or replacing the energy supplied to the dwelling by central power generation 206.

Environmental sensors 172, such as those outlined in the embodiment of FIG. 4 and FIG. 7 may be used by the utility or a third party manager to assess and/or predict the environment of the electrical power generation, distribution, management and utilization. In this embodiment, communications from the central power generation 206 to the controller 168 can be accomplished with a communications link 177. This communications link 177 may also be in conjunction with, or replaced by, a third party management control 224 which may act to manage the system in cooperation or in lieu of the utility. In this particular embodiment, each end-users cluster 111 is controlled and managed by a controller 168. Thus, the network of end-users clusters 111 may be managed by controllers 168 controlling a single cluster thereby simplifying and centralizing the energy storage 212 of the virtual power plant 250 into discrete subunits. In this way, specific end-user clusters 111 may be grouped with similar energy needs and managed as a single entity. External control inputs or data can also be communicated to the controllers 168 to affect the efficiency or desired performance and optimization of the energy storage 212 unit thereby providing even greater optimization of performance in a multitude of application environments.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A system for temporarily shifting the demand for electrical power by an end-user comprising:
    an energy storage unit located in proximity of said end-user that receives electrical energy from a power source and stores said energy as stored energy in a first time period, said energy storage unit that supplies said stored energy to said end-user reducing said end-user demand for said electrical energy in a second time period;
    a controller that controls the operation of said energy storage unit and controls supply of said stored energy to said end-user; and,
    a communications link between a utility manager and said controller that allows said utility manager to manage and control the operations of said controller thereby controlling storage and supply of said stored energy to said end-user.

2. The system of claim 1 further comprising:
    an environmental sensor that senses environmental variables and relays environmental data to said utility manager via said communications link.

3. The system of claim 1 further comprising:
    an environmental sensor that senses environmental variables and relays environmental data on climatic variables, or condition/consumption variables, or cost variables to said utility manager via said communications link.

4. The system of claim 1, wherein said communications link relays performance data from said energy storage unit to said utility manager via said communications link.

5. The system of claim 1, wherein said energy storage unit stores energy in the form of thermal energy, mechanical energy, chemical energy, or electrical energy.

6. The system of claim 1, wherein said controller controls a plurality of said energy storage units.

7. The system of claim 1, wherein said energy storage unit provides said supply of said stored energy to a plurality of said end-users.

8. The system of claim 1, wherein said controller controls a plurality of end-user clusters.

9. The system of claim 1, wherein said utility manager that controls said operations of said controller is a utility company, an energy service company, a demand response aggregator, third party energy manager, or a programmable logic circuit.

10. The system of claim 2, wherein said environmental data consists of at least one of the following real-time variables from the group consisting of:
    time, temperature, relative humidity, dewpoint, UV index, air quality index, carbon emissions, climate zone, power consumption, energy demand, energy consumption, cooling degree days, utility load profiles, energy grid status, current electric power price, current oil price, current propane price, current natural gas price, day-ahead price, day-of price, electric utility revenue, electricity generation price, electricity transmission price, electricity distribution price and energy service company revenue.

11. The system of claim 2, wherein said environmental data consists of at least one of the following projected variables from the group consisting of:
projected temperature, projected relative humidity, projected dewpoint, projected UV index, projected air quality index, projected carbon emissions, projected power consumption, projected energy demand, projected energy consumption, projected cooling degree days, projected utility load profiles, projected energy grid status, projected electric power price, projected oil price, projected propane price, projected natural gas price, projected day-ahead price, projected day-of price electric rate forecast projected electricity generation price, projected electricity transmission price, projected electricity distribution price and projected electric utility revenue.

12. The system of claim 2, wherein said environmental data is derived at the location of said energy storage unit.

13. The system of claim 2, wherein said environmental data is derived at a location remote from said energy storage unit and transmitted to said controller.

14. The system of claim 2, wherein said environmental data is sensed using sensors from a plurality of energy storage units.

15. The system of claim 1, wherein at least a portion of said operation of said energy storage unit and said control of said supply of said stored energy to said end-user is based upon a time dependent value of energy.

16. The system of claim 1, wherein at least a portion of said shifting of demand for electrical power supplied to an end-user is based upon at least one of the following: electricity generation price, electricity transmission price or electricity distribution price.

17. The system of claim 1, wherein at least a portion of said shifting of demand for electrical power supplied to an end-user is in response to a price event, a reliability event, or a load balancing event.

18. The system of claim 1, wherein said communications link between said utility manager and said controller is performed with at least one of the following: a wide area communications interface, an external physical network interface and a wireless network interface.

19. A method of temporarily supplementing the demand for electrical energy supplied to an end-user comprising the steps:
storing a portion of said electrical energy supplied to an end-user with an energy storage unit located in proximity of said end-user comprising the steps:
receiving electrical energy from an electricity source;
converting said electrical energy into another form of energy; and,
storing said converted energy in one time period;
controlling the operations of said energy storage unit with a controller that regulates the amount of energy that is supplied to, and distributed from, said energy storage unit;
controlling the operations of said controller by a utility manager with a communications link between said utility manager and said controller; and,
supplementing said end-user demand for said electrical energy in a second time period by supplying said stored energy from said utility manager controlled energy storage unit to said end-user.

20. The method of claim 19, further comprising the steps:
obtaining environmental data from at least one environmental sensor that senses at least one environmental variable;
transmitting said environmental data to said utility manager via said communications link; and,
regulating the amount of energy that is supplied to, or distributed from, said energy storage unit based upon said environmental data.

21. The method of claim 19, further comprising the steps:
obtaining environmental data from at least one environmental sensor that senses at least one environmental variable from the group consisting of climatic variables, condition/consumption variables, and cost variables;
transmitting said environmental data to said utility manager via said communications link; and,
regulating the amount of said energy that is supplied to, or distributed from, said energy storage unit based upon said environmental data.

22. The method of claim 19, further comprising the steps:
obtaining performance data from said energy storage unit;
transmitting said performance data to said utility manager via said communications link; and,
regulating the amount of said energy that is supplied to, or distributed from, said energy storage unit based upon said performance data.

23. The method of claim 19, further comprising the step:
controlling a plurality of said energy storage units with said controller.

24. The method of claim 19, further comprising the step:
supplementing a plurality of said end-users demand for said electrical energy in said second time period by supplying said stored energy from said utility manager controlled energy storage unit to said plurality of said end-users.

25. The method of claim 19, further comprising the step:
controlling a plurality of end-user clusters with said controller.

26. The method of claim 19, further comprising the steps:
obtaining environmental data from at least one environmental sensor that senses at least one environmental variable;
transmitting said environmental data to said utility manager via said communications link; and,
regulating the amount of energy that is supplied to, or distributed from, said energy storage unit based upon said environmental data that consists of at least one of the following real-time variables:
time, temperature, relative humidity, dewpoint, UV index, air quality index, carbon emissions, climate zone, power consumption, energy demand, energy consumption, cooling degree days, utility load profiles, and energy grid status, current electric power price, current oil price, current propane price, current natural gas price, day-ahead price, day-of price, electric utility revenue, electricity generation price, electricity transmission price, electricity distribution price and energy service company revenue.

27. The method of claim 19, further comprising the steps:
obtaining environmental data from at least one environmental sensor that senses at least one environmental variable;
transmitting said environmental data to said utility manager via said communications link; and,
regulating the amount of energy that is supplied to, or distributed from, said energy storage unit based upon said environmental data that consists of at least one of the following projected variables:

projected temperature, projected relative humidity, projected dewpoint, projected UV index, projected air quality index, projected carbon emissions, projected power consumption, projected energy demand, projected energy consumption, projected cooling degree days, projected utility load profiles, projected energy grid status, projected electric power price, projected oil price, projected propane price, projected natural gas price, projected day-ahead price, projected day-of price electric rate forecast, projected electricity generation price, projected electricity transmission price, projected electricity distribution price and projected electric utility revenue.

28. The method of claim 20, further comprising the steps:

optimizing the operational parameters of said energy storage unit based upon at least one of the following: electricity generation price, electricity transmission price electricity distribution price, time dependent value of energy, electricity generation price, electricity transmission price, electricity distribution price, a price event, a reliability event, and a load balancing event.

29. The method of claim 19, further comprising the steps:

performing said communications link between said utility manager and said controller with a wide area communications interface.

* * * * *